US007069225B2

(12) United States Patent
Kawai

(10) Patent No.: US 7,069,225 B2
(45) Date of Patent: *Jun. 27, 2006

(54) SALES ACTIVITY MANAGEMENT SYSTEM, SALES ACTIVITY MANAGEMENT APPARATUS, AND SALES ACTIVITY MANAGEMENT METHOD

(75) Inventor: Eiji Kawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,129

(22) Filed: Mar. 23, 2005

(65) Prior Publication Data
US 2005/0161500 A1 Jul. 28, 2005

Related U.S. Application Data

(63) Continuation of application No. 09/819,210, filed on Mar. 28, 2001, now Pat. No. 6,910,015.

(30) Foreign Application Priority Data
Mar. 29, 2000 (JP) .............................. 2000-092205

(51) Int. Cl.
*G06F 17/60* (2006.01)
(52) U.S. Cl. .............................. 705/1; 705/26; 705/14; 345/776
(58) Field of Classification Search .................... 705/1, 705/26, 14; 345/776
See application file for complete search history.

(56) References Cited

U.S. PATENT DOCUMENTS 6,449,597 B1 * 9/2002 McGill ........................... 705/1

FOREIGN PATENT DOCUMENTS

DE 0710024 A2 * 10/1994

OTHER PUBLICATIONS

Information on DisnNetwork, 1999-2000,printed through www.archive.org.*
Ed Henry, Don't Buy A New Car, Dec. 1998, The Kiplinger Washington Editors.*

(Continued)

*Primary Examiner*—Naresh Vig
(74) *Attorney, Agent, or Firm*—Frommer Lawrence & Haug LLP; William S. Frommer

(57) ABSTRACT

To automatically manage payment of charge produced between an apparatus manufacturer and an information provider, and to promote sales of an information processing apparatus and information contents.

There are provided: a terminal device 11 to managed so as to manufacture and manage an information processing apparatus 16 and so as to sell to a user 14 an information processing apparatus at a price lower than a desired sales price of an apparatus manufacturer 15; a terminal device 12 managed so as to provide to the user 14 available information contents 18 at the information processing apparatus 16, and then, collect charge; and a sales activity management apparatus 13 for managing the terminal devices 11 and 12 based on a license agreement made in advance between an apparatus manufacturer 15 and an information provider 17, wherein this sales activity management apparatus 13 issues an instruction for the terminal device 12 to return to the terminal device 11 an amount of money corresponding to a difference produced because the apparatus manufacturer 15 has provided the information processing apparatus 16 to the user 14 at a low price according to an amount of money for a charge collected from the user 14.

10 Claims, 19 Drawing Sheets

OTHER PUBLICATIONS

General Information about Dish Network printed from "www.archive.org".

"DISH Network First to Sign At Nite's TV Land", Dish Network, May 2, 1996 printed from "http//web.archive.org/web/19961102121526/www.dishnetwork.com/about/newpress14_t.html".

"EchoStar Communications Adds Liberty Satellite Sports To The DISH Network Lineup", Dish Network, Jul. 2, 1996 printed from "http://web.archive.org/web/19961102121704/www.dishnetwork.com/about/newpress25_t.html".

"EchoStar Joins With Gateway 2000 For Expanded Distribution", Dish Network, Oct. 22, 1996 printed from "http://web.archive.org/web/19961102121902/www.dishnetwork.com/about/newpress40_t.html".

Information on DishNetwork.

Adam Lincoln, "Storage Comes COD", Dec. 2000, The Economist Newspaper Ltd.

Justin Wood, "Sweeping Changes", Mar. 2001, The Economist Newspaper Ltd.

Information on Excel Communications, Inc.

"Airspan Unveils AS400 Wireless Local Loop Solution With Demand-Assigned Air Interface At CITA", Feb. 8, 1999, Airspan Communications Corporation.

"Pan European Crossing Fact Sheet", Oct. 1998, Global Crossing.

Information on Dish Networks, 1999-2000.

Mark Lillycrop, "Capacity on Tap". Jan. 2000, Technical Enterprises, Inc.

"HP introduces instant capacity on demand solutions offering Australian E-services customers immediate additional server capacity", Nov. 16, 1999, Hewlett Packard Corporation.

Stephen Shankland, 'HP Plans "Capacity On Demand" chip plan', Nov. 12, 1999, CNET Networks, Inc.

* cited by examiner

SALES ACTIVITY MANAGEMENT SYSTEM, SALES ACTIVITY MANAGEMENT APPARATUS, AND SALES ACTIVITY MANAGEMENT METHOD

This is a Continuation of application Ser. No. 09/819,210 filed Mar. 28, 2001 now U.S. Pat. No. 6,910,015.

BACKGROUND OF THE INVENTION

1. Field of the Invention

The present invention relates to a sales activity management system, sales activity management apparatus and sales activity management method that is preferably applicable to activities for selling an information processing apparatus from an apparatus manufacturer to a user and selling available information contents at the information processing apparatus from an information provider to the user.

2. Description of the Related Art

In recent years, there are many cases in which a hardware manufacturer sells to a user an information processing apparatus such as tuner device, hand held telephone set, or game machine, a broadcast service provider provides to a user a charged digital broadcast program as available information contents at the information processing apparatus, a communication service provider provides a telephone call service to a user, and a game manufacturer sells game software to a user.

FIG. 1 is a flowchart of materials and money showing an example of a satellite broadcast business model 104 of such type. A charged broadcast business represented by a communication satellite (CS) broadcast, is carried out so that a broadcast service provider 37 that is a platform shown in FIG. 1 provides broadcast services such as charged digital broadcast programs (hereinafter, referred to as charged contents 28) to a user 14, and monthly collects a reception charge (monthly) 38 relevant to charged contents 28 from the user 14.

Namely, with respect to a product (hereinafter, referred to as "hardware") 26 such as a tuner device (broadcast reception terminal device) that is hardware, a hardware manufacturer 35 such as home electronics manufacturer purchases essential parts 40 that can be incorporated in the hardware 26 from a part manufacturer 42. A hardware manufacturer 35 makes a part payment 41 of essential parts 40 to a part manufacturer 42. The hardware 26 having the essential parts 40 incorporated therein is manufactured by a home electronics manufacturer, the hardware 26 is forwarded to the user 14 for sale, after such home electronics manufacturer itself OEM delivers the hardware to a service company, in some instances.

At the time of selling this hardware 26, a broadcast reception contract is made between the broadcast service provider 37 and the user 14. The user 14 that is a subscriber often makes payment for the hardware 26 at one time during purchase. However, with respect to broadcast reception services, a reception charge 38 is generally paid to the broadcast service provider 37 monthly. Therefore, from the viewpoint of a company that is a platform, it is desirable that the hardware 26 such as tuner device become more popular to each of the users 14. Thus, reduction of service charge and reduction of hardware cost are important means for marketing strategy.

FIG. 2 is a flowchart of materials and money showing an example of hand held telephone set communication business model 203. With respect to communication business represented by a hand held telephone set, a company that is a carrier 51' shown in FIG. 2 provides a communication service 48, and collects a base charge and/or an actual telephone call charge 58 from a user 14 monthly.

Namely, with respect to a product (hardware) 46 such as a hand held telephone set that is hardware, a hardware manufacturer 35 purchases essential parts 40 that can be incorporated in the hardware 46 from a part manufacturer 42. The hardware manufacturer 35 makes a part payment 41 of essential parts 40 to the part manufacturer 42. The hardware manufacturer 35 acquires a technical standard 45 from a communication service provider 47, manufactures the hardware 46 such as hand held telephone set, the hardware 46 is forwarded to the user 14 for sale, after the home electronics manufacturer itself OEM delivers it to a service company, in some instances.

Therefore, from the viewpoint of a company of carrier 51', it is desirable that hardware 46 such as hand held telephone set is more popular among the user 14. Thus, reduction of service charge and reduction of a hand held telephone are essential marketing strategy means. At present, an incentive (sales reward) 74 may be temporarily paid to shops that sell hand held telephones. This is a prospect investigation for profit of actual telephone call charge, assuming that the user 14 continues subscriber contract for a certain period of time.

FIG. 3 is a flowchart of materials and money showing an example of a game software and home use game machine business model 302. In a closed format represented by a home use game machine, a company that is a format holder (licenser) 60' shown in FIG. 3 purchases essential parts 40 from the part manufacturer 42. The hardware manufacturer 35 makes a part payment 41 of essential parts 40 to the part manufacturer 42. The hardware manufacturer 35 manufactures and sells a product (hardware) 66 such as game machine (set) that is hardware having the essential parts 40 incorporated therein.

This hardware manufacturer 35 permits a license 80 to a software production company (hereinafter, referred to as software manufacturer) 67 called third party, and asks to produce a product (software) 68 such as software (title) that operates under the game machine only. The software 68 is sold from the software manufacture 67 to the user 14. When the software manufacturer 67 receives license permission, in general, software royalty 64 that indicates how much software is sold to the user 14, for example, is paid to the hardware manufacturer 35 that is a format holder 60'.

In this way, the hardware manufacturer 35 and software manufacturer 67 maintain mutuality. Since the format holder 60' can expect royalty profit from the software manufacturer 67, even if hardware profit is reduced (in an extreme case, even if the profit is 0), selling is possible. As a result, from the viewpoints of an end user, a game machine can be purchased at a modest price, whereby the spread of hardware such as such game machine is promoted.

In the meantime, according to the sales activity management method as described above, in general, it is evident that, when the sales price of hardware is lower than the current price, it leads to the further spread and promotion of the hardware and software. However, the following problems still remain.

<1> Due to a "barrier" of an original price in which a total cost of parts configuring hardware is dominant or due to the circumference that the hardware manufacturer 35 assures profits, it is not preferable to further reduce prices without any improvement from the viewpoint of company management.

<2> The hardware manufacturer 35 takes the form of doing hardware businesses for purchasing essential parts from part manufacturers, and manufacturing and selling hardware. Thus, it is difficult to supply hardware at a price lower than a predetermined price, although the entirety is format business. This results in an obstacle to further reduction of hardware price.

<3> In a company that is a platform or carrier 51', in a case in which an incentive 74 is paid at the time of selling hardware, in the event where the subscriber cancels reception contrast or telephone call contract earlier, there is expected a circumference that the company imposes a large risk that a back margin occurs.

<4> In addition, the part manufacturer 42 takes the form of doing hardware businesses for delivering essential parts 40 to the format holder 60'. Thus, it is difficult to supply essential parts 40 at a price lower than a predetermined price, although the entirety is format business. This results in an obstacle to further reduce a hardware price.

<5> In the format holder 60' for manufacturing and selling hardware, if hardware profit is reduced (in an extreme case, if the profit is 0), in the case where game software is not sold, there is expected a circumference that the company imposes a large risk that no profit is obtained with great effort.

<6> In order to solve <1> to <5>, in the case where a license agreement is made between the part manufacturer (hereinafter, referred to as part manufacturing company) 42 and hardware manufacture 35, between the hardware manufacturer. (hereinafter, referred to as hardware manufacturing company) 35 and the broadcast service provider 37 or information provider such as communication service provider or software production company, it is expected that the payment and management of royalty between these providers becomes complicated.

SUMMARY OF THE INVENTION

The present invention has been made to solve such problems. It is an object of the present invention to provide a sales activity management system, apparatus, and method capable of automatically managing payment of royalty that occurs between the apparatus manufacturer and the information provider, and capable of accelerating sales of an information processing apparatus and information contents.

The above described problems are solved by a sales activity management system for selling an information processing apparatus from an apparatus manufacturer to a user, and selling available information contents at the information processing apparatus from an information provider to the user, said activity management system characterized by comprising: an apparatus manufacture management terminal device for managing manufacture of said information processing apparatus, and managing a sales price of said apparatus manufacturer; an information provision management terminal device managed as to provide to a user, available information contents at said information processing apparatus and to collecting a charge; and a sales activity management apparatus for setting an amount of money to be remitted to said manufacture according to charge information input from said information provision terminal device.

In a sales activity management system according to the present invention, for example, a license contrast is made with respect to sales of an information processing apparatus and information contents between an apparatus manufacturer and an information provider. The information processing apparatus is manufactured and forwarded to a user for sales from an apparatus manufacture management terminal device at a price lower than the apparatus manufacturer's desired selling price. On the other hand, if available information contents at the information processing apparatus is provided from the information provision management terminal device to a user, the charge is managed so as to be collected by the information provision management terminal device. In the sales activity management apparatus, in order to manage an information provision management terminal device and an apparatus manufacture management terminal device based on a license agreement, an amount of money (royalty) to be remitted to the apparatus manufacturer is set according to charge information input from the information provision terminal device.

Therefore, the payment of royalty produced under a license agreement made between the apparatus manufacturer and the information provider can be automatically managed. Moreover, the sales of information processing apparatus and information contents can be promoted. This royalty includes an amount corresponding to a difference generated because the apparatus manufacturer provides the information processing apparatus to a user at a low price, interest during the license agreement, and the charge based on the license agreement. In this manner, the user can obtain the information processing apparatus at a price lower than the apparatus manufacturer's desired selling price. As a result of many information processing apparatuses becoming popular among users, there are many opportunities for the users to use information contents caused by the information provider. As a result, it is expected that an increased amount of royalty is paid from the user to the information provider.

In this manner, there are an increased amount of money for the difference returned from the information provider to the apparatus manufacturer. Thus, the sales and profits of each of the apparatus manufacturer and information provider produced under. Moreover, there can be expanded the manufacturing technology field of the information processing apparatus, the technical field of providing the information contents used therefor, and the business scale of the entire information processing medium concerning the third party of the user that uses these information processing apparatus or information contents, which greatly contributes to industrial development.

The sales activity management apparatus according to the present invention is directed to an apparatus for integrally managing businesses of selling an information processing apparatus from the apparatus manufacturer to the user, and selling the available information contents at the information processing apparatus from the information provider to the user, the apparatus being characterized by comprising: operation means for operating sales information concerning a sales quantity of the information processing apparatus and use information on information contents to be accepted; storage means for storing sales information on an information processing apparatus and use information on information contents accepted by this operation means; and management control means for setting an amount of money to be remitted to the apparatus manufacturer according to sales information and use information stored in this storage means.

In the sales activity management apparatus according to the present invention, in the case of integrally managing businesses for selling an information processing apparatus from the apparatus manufacturer to the user, and selling the available information contents at the information processing apparatus from the information provider to the user, when a license agreement is made in advance between the apparatus manufacturer and information provider, operation means is operated so as to accept sales information concerning the sales quantity of information processing apparatus and use count of the information contents. The sales information-on the information processing apparatus accepted by this operation means and use information on the information contents are stored in storage means. Management control is performed so as to an amount of money remitted to the apparatus manufacturer according to the sales information and use information stored in this storage means.

For example, management control is performed so as to return an amount of money corresponding to a difference produced because the apparatus manufacturer provides an information processing apparatus to a user at a low price from the information provider to the apparatus manufacturer according to an amount of money for the charge collected from the user.

Therefore, the payment of royalty produced under the license agreement made between the apparatus manufacturer and the information provider can be automatically managed. Moreover, the sales promotion of the information processing apparatus and information contents can be assisted.

The sales activity management method according to the present invention is directed to a method of managing businesses of selling an information processing apparatus from an apparatus manufacturer to a user, and selling available information contents at the information processing apparatus from the information provider to the user, characterized in that a license agreement concerning the sales of information processing apparatus and information contents is made between the apparatus manufacturer and the information provider, the manufacture of the information processing apparatus is managed, the information processing apparatus is forwarded to the user for sales at the apparatus manufacturer's sales price, available information contents at the information processing apparatus is provided to the user, the charge is collected, and an amount of money to be remitted to the apparatus manufacturer is set according to an amount of money for the charge collected from the user.

In the sales activity management method according to the present invention, even in the case where an information processing apparatus is forwarded to a user for sales at a price lower than the apparatus manufacturer's desired price, the royalty produced under the license agreement made between the apparatus manufacturer and the information provider can be obtained by the apparatus manufacturer. Moreover, the sales of the information processing apparatus and information contents can be promoted. Moreover, there can be expanded the manufacturing technology field of the information processing apparatus, the technical field of providing the information contents used therefor, and the business scale of the entire information processing medium concerning the third party of the user that uses these information processing apparatus or information contents, which greatly contributes to industrial development.

DESCRIPTION OF THE PREFERRED EMBODIMENT

Now, one embodiment of the sales activity management system, apparatus, and method according to the present invention, will be described here with reference to the accompanying drawings.

(1) First Embodiment

Figure 1:
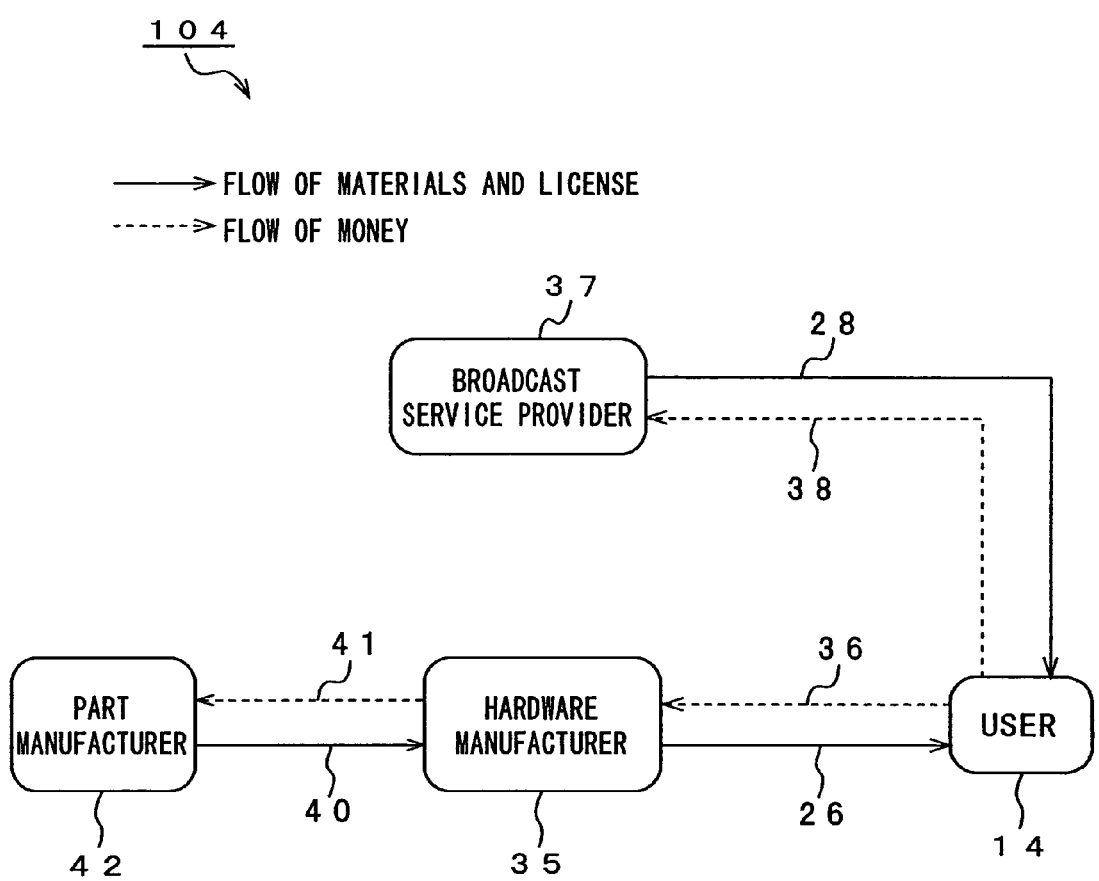
FIG. 1 is a flowchart of materials and money showing an example of a business model 104 for satellite broadcasting.
Figure 2:
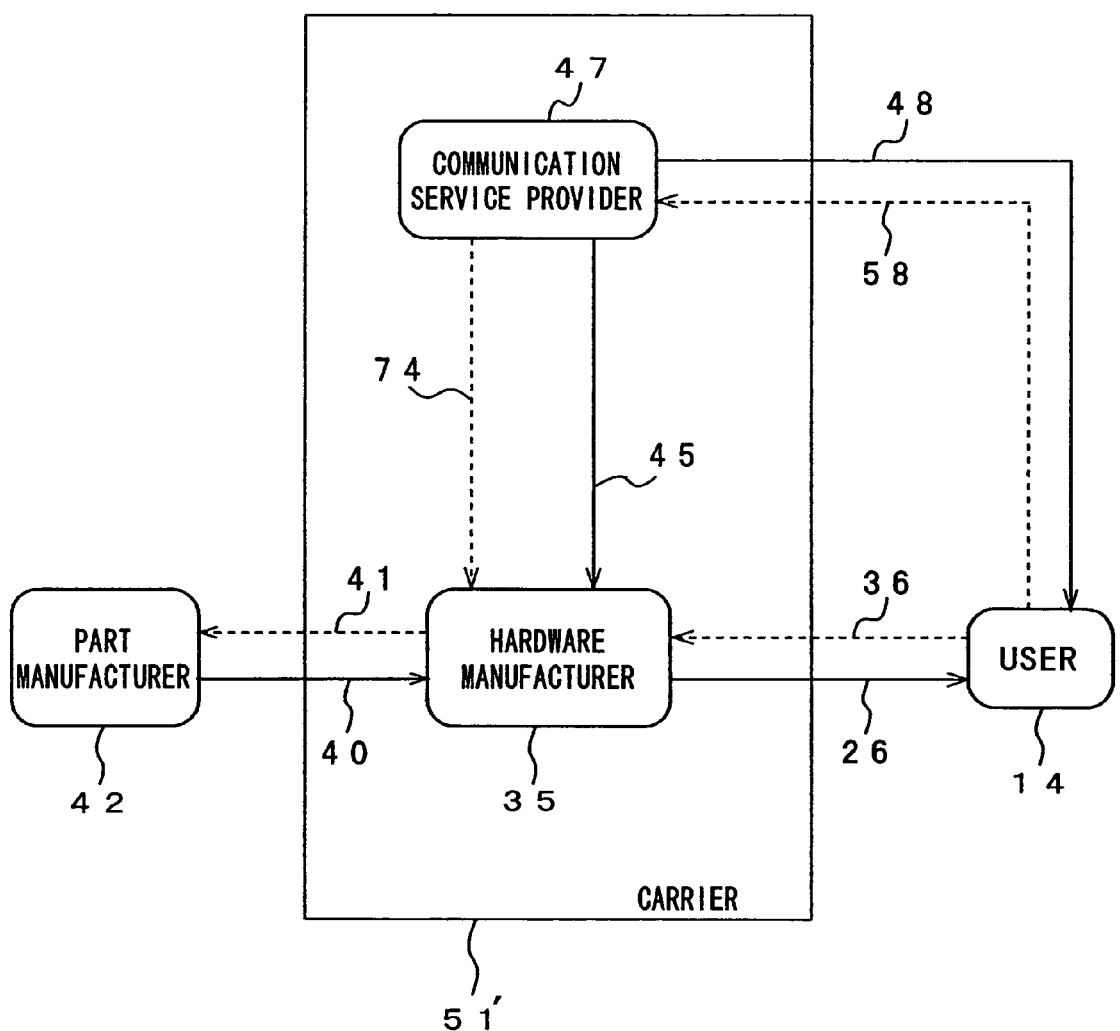
FIG. 2 is a flowchart of materials and money showing an example of a communication business model 203 for a hand held telephone set.
Figure 3:
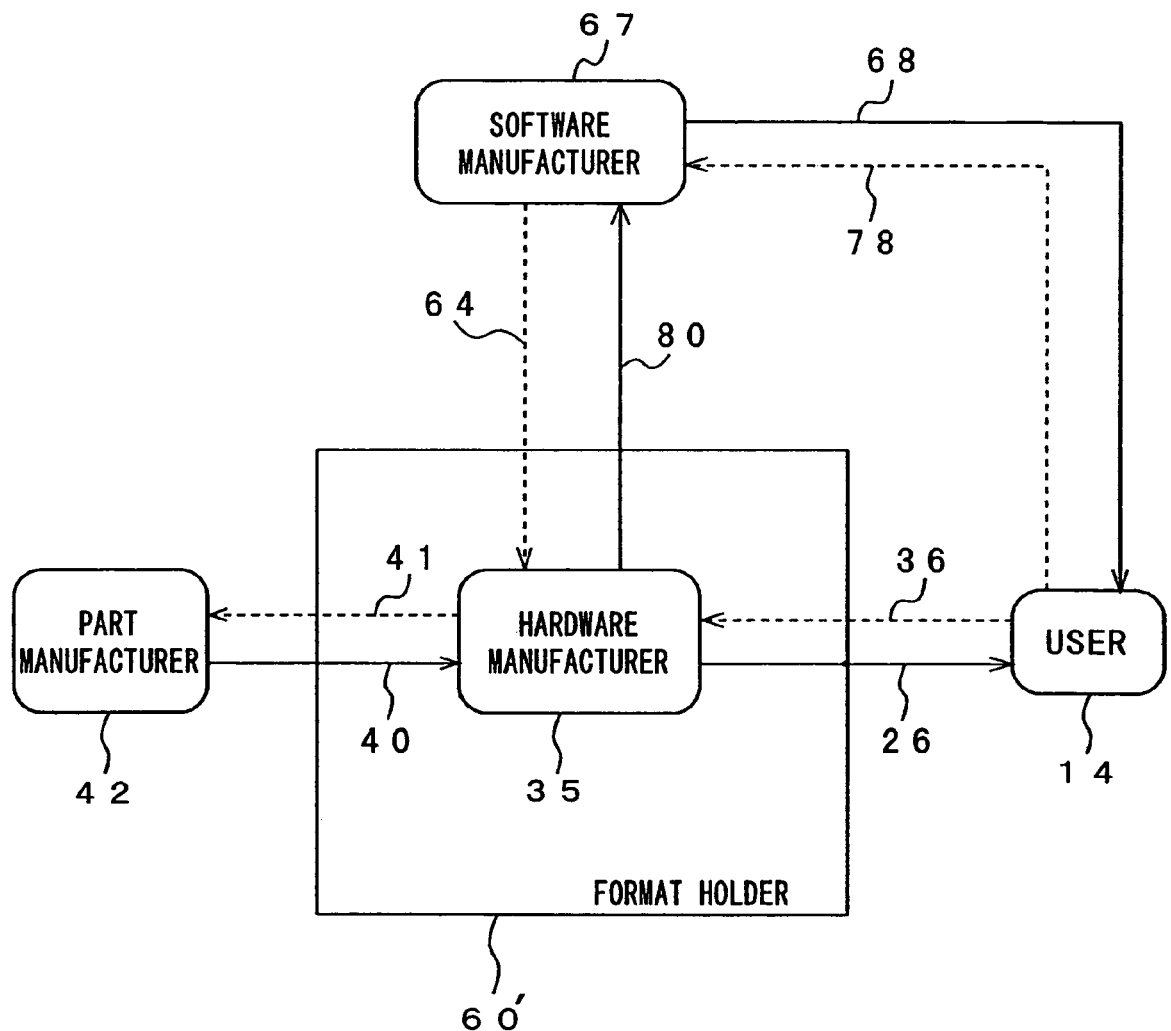
FIG. 3 is a flowchart of materials and money showing an example of a business model 302 for the game software and home-use game machine.
Figure 4:
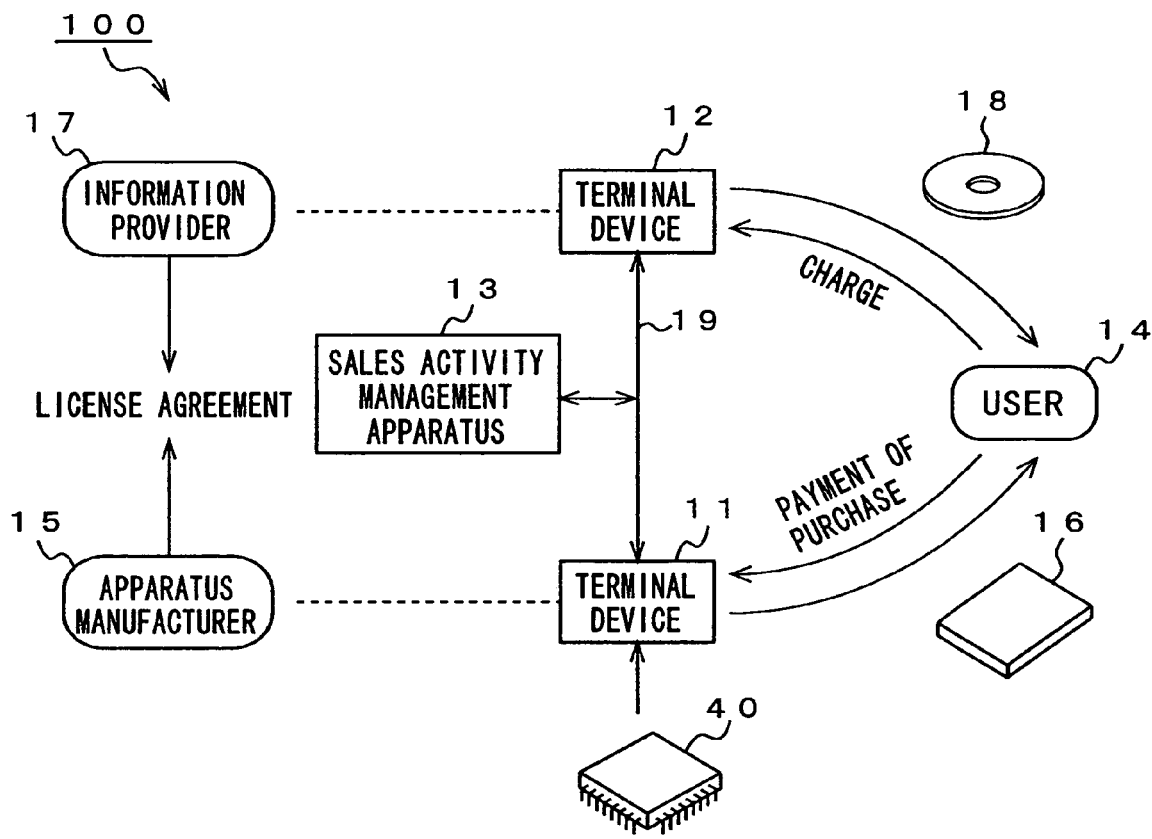
FIG. 4 is a block diagram depicting an exemplary configuration of a sales activity management system 100 that is a first embodiment according to the present invention.

FIG. 4 is a block diagram depicting an exemplary configuration of a sales activity management system 100 according to a first embodiment of the present invention.

In the present embodiment, in the case where an apparatus manufacturer sells an information processing apparatus to a user, and an information provider sells the available information contents at the information processing apparatus to the user, there is provided a sales activity management apparatus for managing sales activities based on a license agreement made in advance between the apparatus manufacturer and the information provider. Then, an amount of money corresponding to the difference produced because the apparatus manufacturer provides an information processing apparatus to a user at a low price is returned from an information provision management terminal device to an apparatus manufacture management terminal device according to an amount of money of the charge collected from the user so that the payment of royalty produced between the apparatus manufacturer and the information provider can be automatically managed, and the sales of the information processing apparatus and information contents can be promoted.

A sales activity management system 100 shown in FIG. 4 is a system for managing businesses for an apparatus manufacturer 15 to sell an information processing apparatus 16 to a user 14, and for an information provider 17 to sell available information contents 18 at the information processing apparatus 16 to the user 14. The information processing apparatus 16 includes a tuner device capable of receiving a charged broadcast program, a game machine and hand held telephone set or the like. The information contents 18 include a charged broadcast program or game software and the like. In this system 100, a license agreement is made in advance with respect to the sales of these information processing apparatus 16 and information contents 18 between the apparatus manufacturer 15 and the information provider 17.

At least the contents of the license agreement include the following:

<1> An information processing apparatus 16 is forwarded to a user 14 for sales at a price lower than the desired sales price of the apparatus manufacturer 15;

<2> An information provider returns to an apparatus manufacturer an amount of money for a difference between the desired sales price of the apparatus manufacturer 15 and an actual sales price for the user 14 (hereinafter, referred to as an amount of money corresponding to a difference) in the form of a set royalty according to an amount of money for a charge collected from the user;

<3> An amount of money for a set royalty;

<4> Limit of payment of a set royalty;

<5> Validity of license;

<6> Date of enforcement;

<7> Date of Agreement made; and

<8> Persons targeted for agreement such as apparatus manufacturer 15 or information provider 17

The set royalty includes an amount of money corresponding to a difference produced because an apparatus manufacturer provides an information processing apparatus to a user at a low price or interest during the license agreement, charge based on license agreement or the like.

An information provider 17 may be a broadcast service provider that provides information contents 18 such as charged broadcast program to a user 14, and collect a reception charge from the user 14 or a communication service. provider that provides telephone call service to the user 14, and collects a base charge and actual telephone call charge from the user 14. Further, the information provider 17 may be an information medium seller that manufactures and sells to the user an information medium having information contents 18 such as game software recorded therein, and collects a product payment from the user 14.

In this sales activity management system 100, an apparatus manufacture management terminal device 11 is provided at an apparatus manufacturer 15, an information processing apparatus 16 incorporating essential parts 40 purchased from a part manufacturer, for example, is manufactured and managed, and the information processing apparatus 16 is managed so as to be forwarded to the user 14 for sales at a price lower than the desired sales price of the apparatus manufacturer 15. A notebook type or desktop type personal computer is used for this terminal device 11.

To this terminal device 11, an information provision management terminal device 12 is connected through a communication line 19 serving as communication means. Available information contents 18 at the information processing apparatus 16 manufactured by an apparatus manufacturer 15 are provided to the user, and are managed by the information provider 17 so as to collect a charge. For communication means, Internet, telephone line, satellite line, or leased communication line as well as communication line 19 is used. To this terminal device 12, a sales activity management apparatus 13 is connected via the communication line 19 so as to manage an apparatus manufacture management terminal device 11 and an information provision management terminal device 12 based on the license agreement concerning the sales of the information processing apparatus 16 and information contents 18 made in advance between the apparatus manufacturer 15 and the information provider 17. In the sales activity management apparatus 13, an amount of money to be remitted to the apparatus manufacturer 15 is set according to the charge information input from this terminal device 12.

For example, the sales activity management apparatus 13 issues an instruction so that the information provision management terminal device 12 returns to the apparatus manufacture management terminal device 11 an amount of money of the difference produced because the apparatus manufacturer 15 has provided the information processing apparatus 16 to the user 14 at a lower price, according to an amount of money for the charge collected from the user 14.

Otherwise, the sales activity management apparatus 13 controls input/output of the above described apparatus manufacture management terminal device 11 and the information provision management terminal device 12 connected via a communication line 19 so as to integrally manage delivery information concerning the delivery count of essential parts of the information processing apparatus 16; sales information concerning the sales quantity of the information processing apparatus 16; or use information concerning use count of information contents 18.

Figure 5:
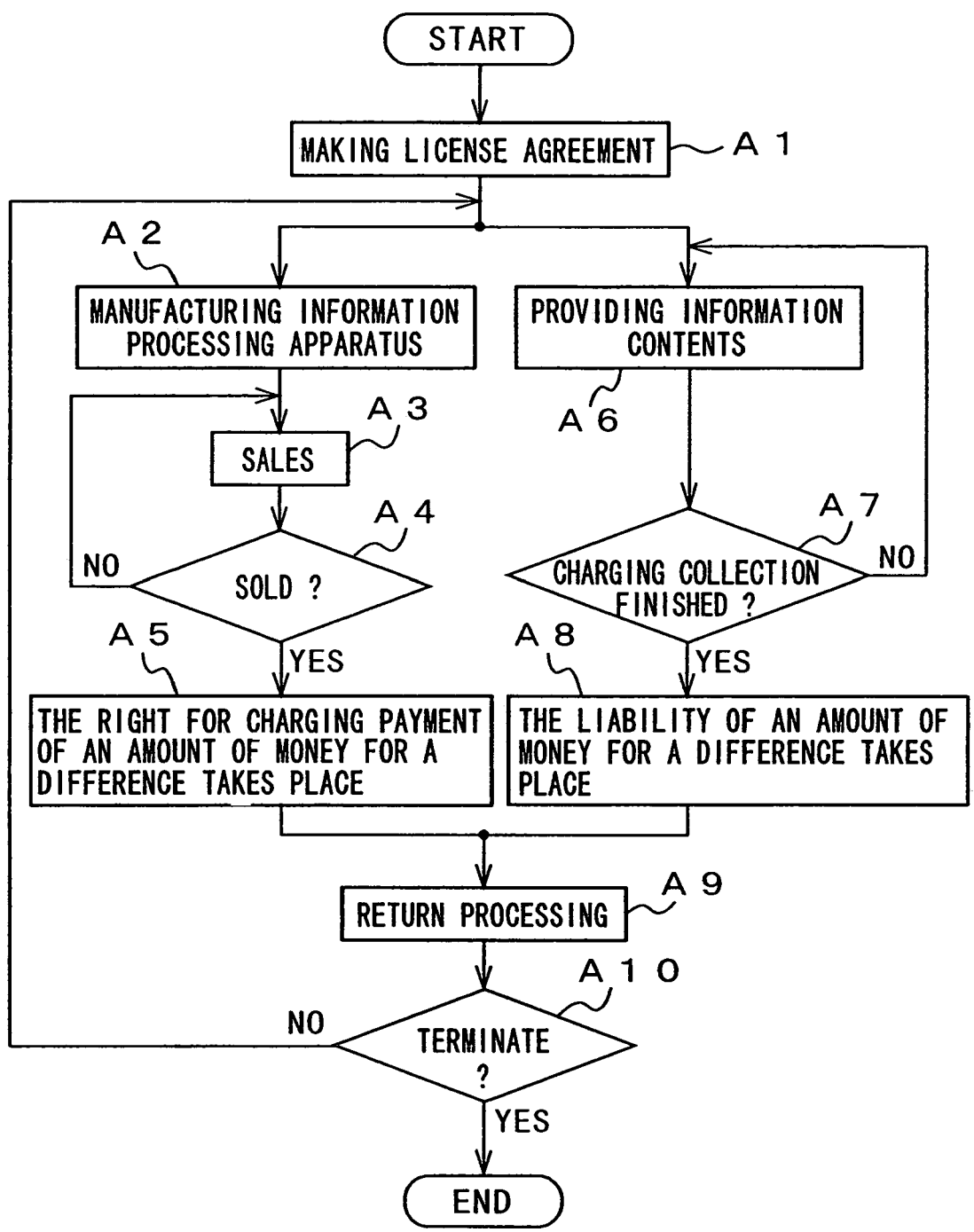
FIG. 5 is a flowchart showing a processing example of the sales activity management system 100.

Now, a sales activity management method according to the present invention will be described with reference to a processing example in the system 100. FIG. 5 is a flowchart showing a processing example in the sales activity management system 100.

In the present embodiment, assume that an apparatus manufacturer 15 sells an information processing apparatus 16 to a user 14, and an information provider 17 sells available information contents 18 at the information processing apparatus 16 to the user. In addition, presumedly, a sales activity management apparatus 13 for managing sales activities is provided based on the license agreement made in advance between the apparatus manufacturer 15 and the information provider 17; and an information provision management terminal device 12 returns to an apparatus manufacture management terminal device 11, an amount of money corresponding to a difference produced because the apparatus manufacturer 15 has provided the information processing apparatus 16 to the user 14 at a low price, the interest during the license agreement, charge based on the license agreement or the like, according to the charge collected from the user 14.

With these presumptions being defined as sales management conditions, at the step A1 of the flowchart shown in FIG. 5, the license agreement concerning the sales of the information processing apparatus 16 and the information contents 18 is made in advance between the apparatus manufacturer 15 and the information provider 17. Reference is made to the above described <1> to <7> for the contents of the license agreement.

Then, at the step A2, at the apparatus manufacturer 15 an information processing apparatus 16 to which a set royalty is applied is manufactured and managed so as to be shipped to shops or the like.

For example, the sales quantity of information processing apparatus 16 shipped to shops is grasped as sales information. At the step A3, at shops or the like, the information processing apparatus 16 is forwarded to the user 14 for sales at a price lower than the desired sales price of the apparatus manufacturer 15. Then, processing goes to the step A4 at which it is checked whether or not the information processing apparatus 16 sells. When only one information processing apparatus 16 sells, processing goes to the step A5 at which there occurs a payment charge right such as an amount of money corresponding to a difference, interest during the license agreement, charge based on the license agreement or the like.

On the other hand, in parallel to the manufacture and sales of the information processing apparatus 16, at the step A6, the information provider 17 provides to the user 14 available information contents 18 at the information processing apparatus 16. The charge is collected from the user 14 by provision of the information contents 18. Then, processing goes to the step A7 at which it is checked whether or not the charge of information contents 18 has been collected from the user 14. In the case where the charge is not collected from the user 14, processing reverts to the step A6 at which the collection of the charge is continued. When the charge is collected even for one item, processing goes to the step A8 at which there occurs liability of an amount of money for a difference relevant to the sales of the information processing apparatus 16.

Then, processing goes to the step A9 at which return processing is done such that an amount of money corresponding to a difference produced because the apparatus manufacturer 15 has provided an information processing apparatus 16 to a user 14 at a low price is returned from the information provider 17 to the apparatus manufacturer 15 according to an amount of money for the charge collected from the user 14.

Then, processing goes to the step A10 at which it is judged whether or not to terminate management of sales activities. This judgment is made by both of the information provider 17 and apparatus manufacturer 15. There are two cases; a case where the management is terminated by expiration of terms according to the license agreement and a case where the management is terminated by cancellation. In the case where this sales activity management is not terminated, processing reverts to the steps A2 and A6 at which the apparatus manufacturer 15 is managed so as to manufacture the information processing apparatus 16 and ship it to shops. Then, in parallel to the manufacture and sales of this information processing apparatus 16, the information provider 17 provides information contents 18 to the user 14, and collects the charge from the user 14.

Therefore, the payment of royalty including an amount of money corresponding to the difference produced under the license agreement made between the apparatus manufacturer 15 and the information provider 17 can be automatically managed. Moreover, the sales of the information processing apparatus 16 and information contents 18 can be promoted. In this manner, the user 14 can obtain the information processing apparatus 16 at a lower price than the desired sales price of the apparatus manufacturer 15. As a result of many information processing apparatuses 16 becoming popular among the users 14, there are many opportunities that the users use information contents 18 provided by the information provider 17. As a result, it is expected that an increased amount of money for charge is paid from the users 14 to the information provider 17.

In this way, an increased amount of money for the difference is returned from the information provider 17 to the apparatus manufacturer 15, and thus, the sales and profits of each of the apparatus manufacturer 15 and information provider 17 can be increased. Moreover, there can be expanded the manufacturing technology field of the information processing apparatus 16, the technical field of providing the information contents 18 used therefor, and the business scale of the entire information processing medium concerning the third party of the user 14 that uses these information processing apparatus 16 or information contents 18, which greatly contributes to industrial development.

EXAMPLE 1

Figure 6:
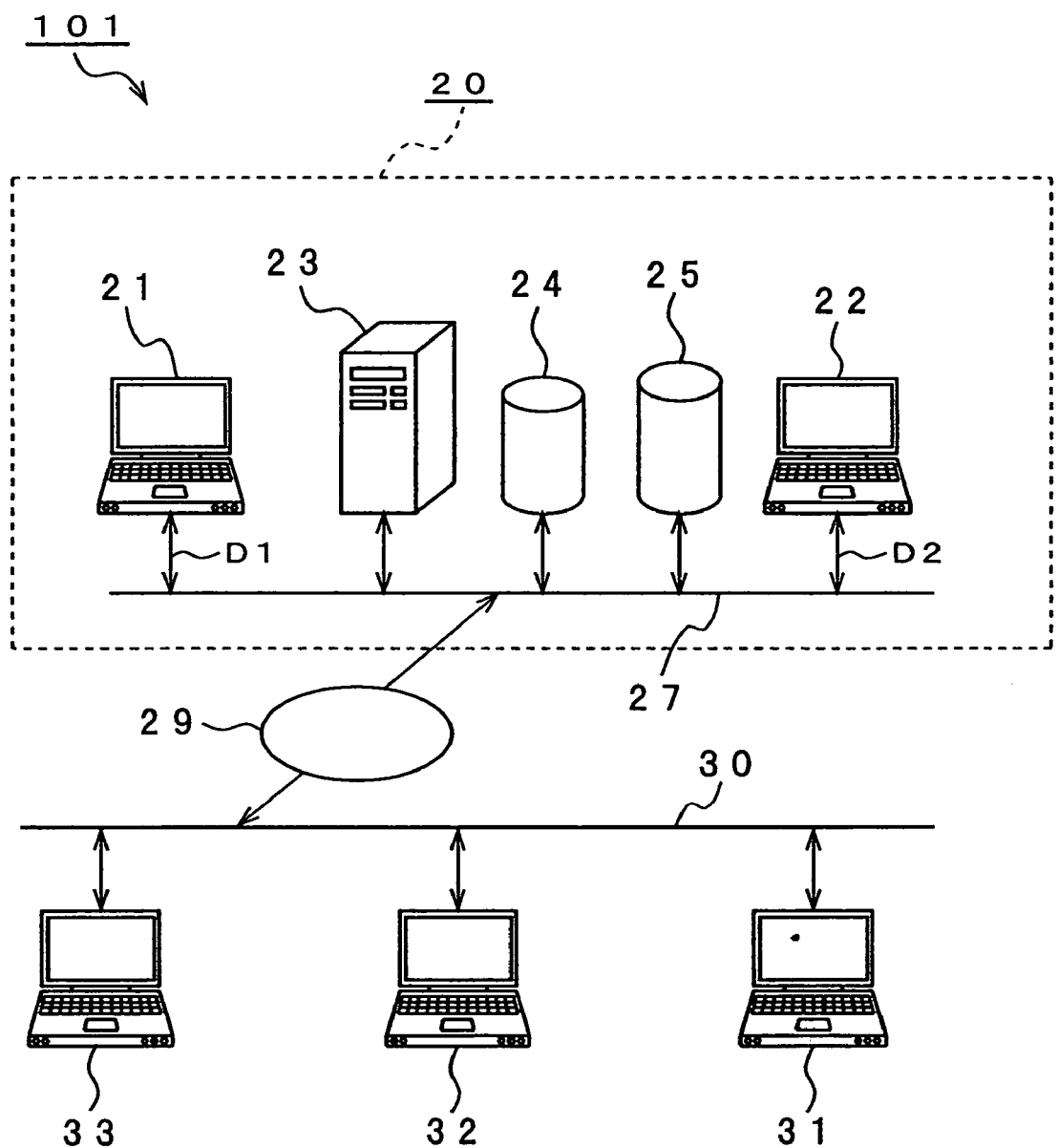
FIG. 6 is a block diagram depicting an exemplary configuration of a set royalty business system 101 that is a first embodiment according to the present invention.

FIG. 6 is a block diagram depicting an exemplary configuration of a set royalty business system 101 according to Example 1 of the present invention.

In this example, in the case where a hardware manufacturer sells to a user an information processing apparatus for receiving charged broadcast programs, and a broadcast service provider broadcasts to the user available charged broadcast program contents at the information processing apparatus, an accounting server system 20 for managing a set royalty is provided based on the license agreement made in advance between the hardware manufacturer and the broadcast service provider.

In addition, a set royalty concerning an amount of money for a difference produced because a hardware manufacturer has provided an information processing apparatus to a user at a low price, interest during the license agreement, and charge based on the license agreement or the like is returned from a broadcast service provider management terminal device 22 shown in FIG. 6 to a hardware manufacturer management terminal device 21. Then, the payment of royalty produced between the hardware manufacturer and the broadcast service provider can be automatically managed, and the sales of the information processing apparatus and utilization of charged broadcast programs can be promoted.

A set royalty business system 101 shown in FIG. 6 is provided as an example of a sales management apparatus. This system comprises at least an accounting server system 20 shared by the hardware manufacturer and broadcast service provider so that an amount of money remitted to the hardware manufacturer is set according to the charge information input from the broadcast service provider's terminal device 22. This set royalty business system 101 integrally manages businesses for the hardware manufacturer to sell a tuner device that is an example of information processing apparatus to a general consumer (user), and for the broadcast service provider to broadcast to the user, charged broadcast program contents that are available information contents at the tuner device. In this system 101, a license agreement is made in advance between the hardware manufacturer and the broadcast service provider with respect to sales of these tuner devices and provision of charged broadcast programs.

This accounting server system 20 has a local network 27. To this local network 27, there is connected a hardware manufacturer management terminal device 21 or broadcast activity management terminal device 22 that is an example of operation means. The former terminal device 21 is set up at the apparatus manufacturer's site or head office, and is used for manufacturing and managing a tuner device. This terminal device 21 is operated so as to input manufacture & shipment information concerning the manufacture count of tuner device. This manufacture & shipment information occurs when the hardware manufacturer manufactures a tuner device, and ships such tuner device to shops.

The latter terminal device 22 is set up at the broadcast service provider's site or the like. The broadcast service provider provides to a user the available charged broadcast program contents at the tuner device manufactured by the hardware manufacturer, and collects a reception charge from the user. This terminal device 22 is operated so as to input subscriber information (number of subscribers) concerning charged broadcast programs and reception charge collection result information (hereinafter, referred to as "use information"). Thee subscriber information is produced when a contract concerning charged broadcast programs is made with the broadcast service provider, and the reception charge collection result information is produced when the user pays a reception charge concerning charged broadcast products to a broadcast service provider.

To these terminal devices 21 and 22, there are connected a hardware database 24 and a subscriber database 25 that are provided as an example of storage means. In the hardware database 24, the manufacture & shipment information on the tuner device input by the hardware manufacturer is recorded so that its contents are updated. The sales information (sales result information) concerning the sales count of the tuner device is updated by shops. The subscriber database 25 stores use information concerning charged broadcast programs inputted by the broadcast service provider so that its contents are updated. The sales information concerning the tuner device as well is updated in the subscriber database 25.

In this accounting server system 20, there is provided a server main body 23 that is provided as an example of management control means. With respect to an amount of money for the difference produced because the hardware manufacturer has provided a tuner device to a user at a low price, a set royalty including interest during the license agreement, a charge based on the license agreement is managed and controlled so as to be returned from the broadcast service provider to the hardware manufacturer. Specifically, the server main body 23 issues an instruction so as to return a set royalty from the terminal device 22 to the terminal device 21.

In this example, a set royalty is paid according to an amount of money for the reception charge collected from the user, namely, based on sales information and use information stored in the hardware database 24 and subscriber database 25 and the license agreement made in advance between the hardware manufacturer and broadcast service provider. This set royalty is automatically managed and controlled by the server main body 23.

To this accounting server system 20, a communication network 29 such as Internet, telephone line, satellite line is connected, and a public network 30 is connected. To this public network 30, a sales company terminal device 31 is connected and managed so as to sell to a consumer the tuner device to which a set royalty is applied at a price lower than the hardware manufacturer's desired sales price. The sales information (sales result information) concerning the sales quantity of the tuner devices sold to the consumers is operated by the terminal device 31 so as to be updated by the subscriber database 25. For example, a specific ID number assigned to the tuner device is read by the terminal device 31 together with the consumer's private information, and is recorded in the subscriber database 25.

Otherwise, a manufacturing section terminal device 32 and a part manufacturer terminal device 33 are connected to the public network 30. The delivery information concerning the delivery count of essential parts of the tuner device or manufacture & shipment information concerning the shipment count of the tuner device and the like is transferred to the hardware database 24. The server main body 23 controls input/output of the above mentioned five terminal devices 21, 22, 31, 32 and 33 connected via a local network 27, communication network 29, public network 30 or the like so as to integrally manage delivery information concerning the delivery count of essential parts of the tuner device, sales information concerning the sales quantity of tuner device, use information concerning the reception contract count of charged broadcast program. A notebook type or desktop type personal computer is used for terminal devices 21, 22, 31, 32 and 33.

In this example, tuner device sales information, subscriber information and reception charge result information are recorded in the subscriber database 25. Thus, information on subscribers using the tuner devices is available. That is, the monthly reception charges obtained by the tuner devices are available.

From these items of subscriber information and reception charge collection result information, the broadcast service provider periodically pays to the hardware manufacturer a predetermined percentage (for example, 10%) of the monthly reception charge collected from the user as a set royalty. Here, in the case where a user repurchases an old tuner device for a new product during the same reception contract period, the payment of the set royalty concerning such old tuner device is terminated. Then, there is produced a duty of paying the set royalty of a new tuner device to the hardware manufacturer that manufactures and sells it.

The above mentioned server main body 23, hardware database 24 and subscriber database 25 are set up at either one of the broadcast service provider and hardware manufacturer based on the license agreement. In any case as well, the accounting server system 20 can update, browse, maintain data from a specific person from any company or business office.

Therefore, the hardware manufacturer can obtain a set royalty that has not been obtained in conventional hardware businesses, and thus, the tuner device can sell at a price lower than the desired sales price in comparison with the conventional system. Assuming that the other manufacturing conditions or the like are totally identical to those in the conventional system, in a set royalty business system 101 of the present invention, a tuner device will sell better. This results in an increased number of subscribers, which is preferable.

Figure 7:
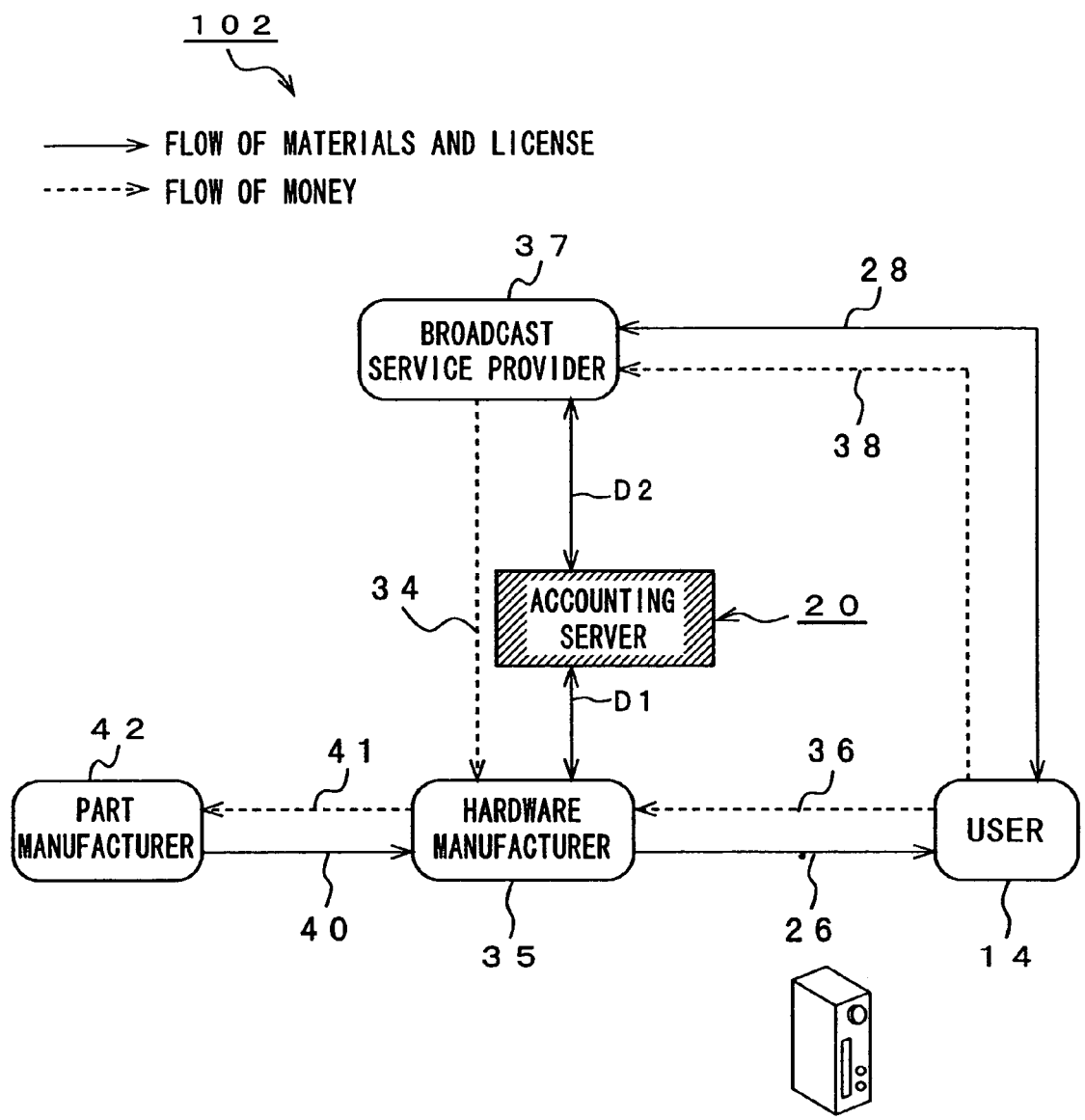
FIG. 7 is a flowchart of materials, license and money showing an example of a business model 102 in which a set royalty is applied to broadcast service.
Figure 8A:
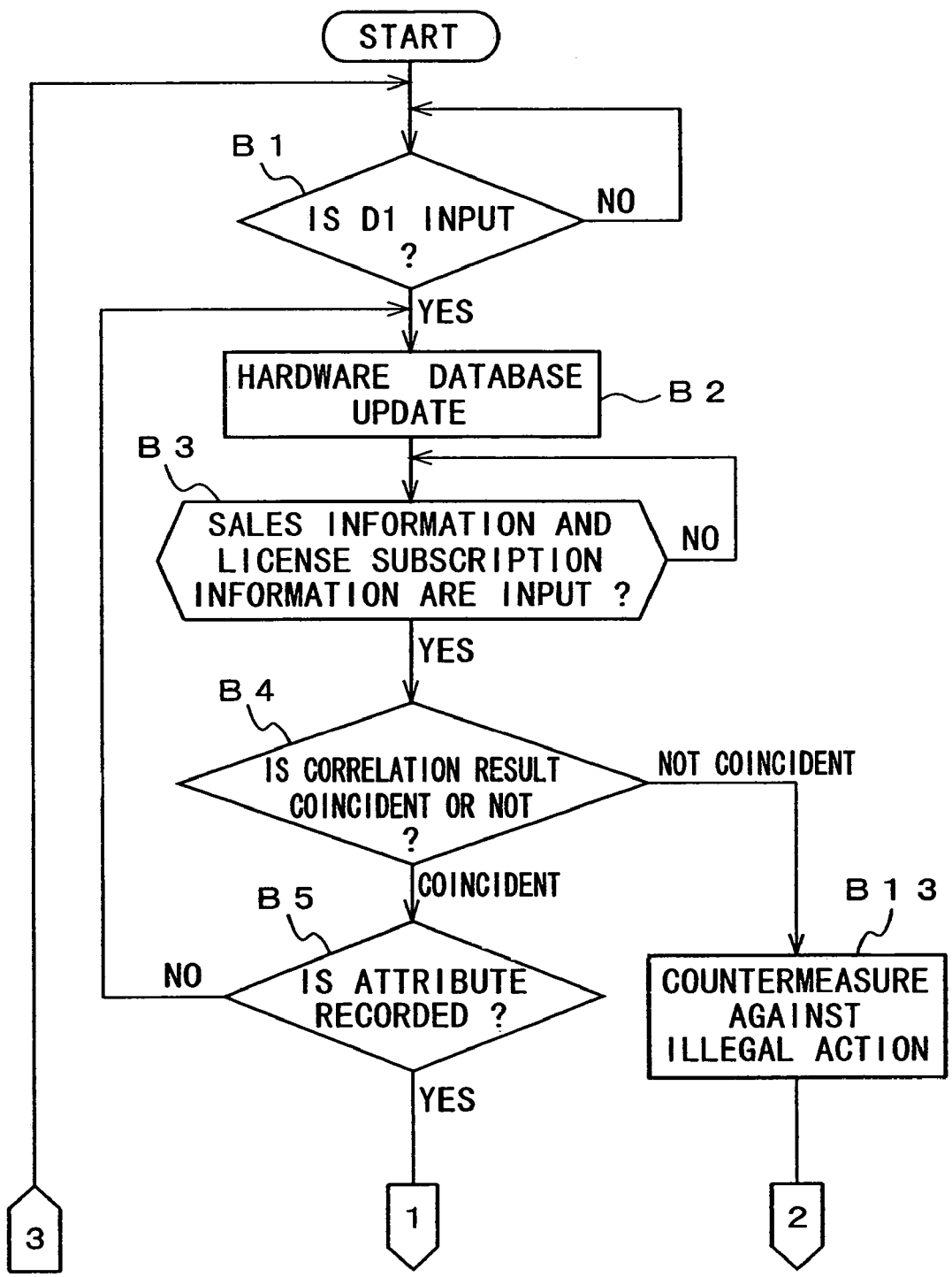
FIGS. 8A and 8B are flowcharts showing a processing example in the accounting server system 20.
Figure 8B:
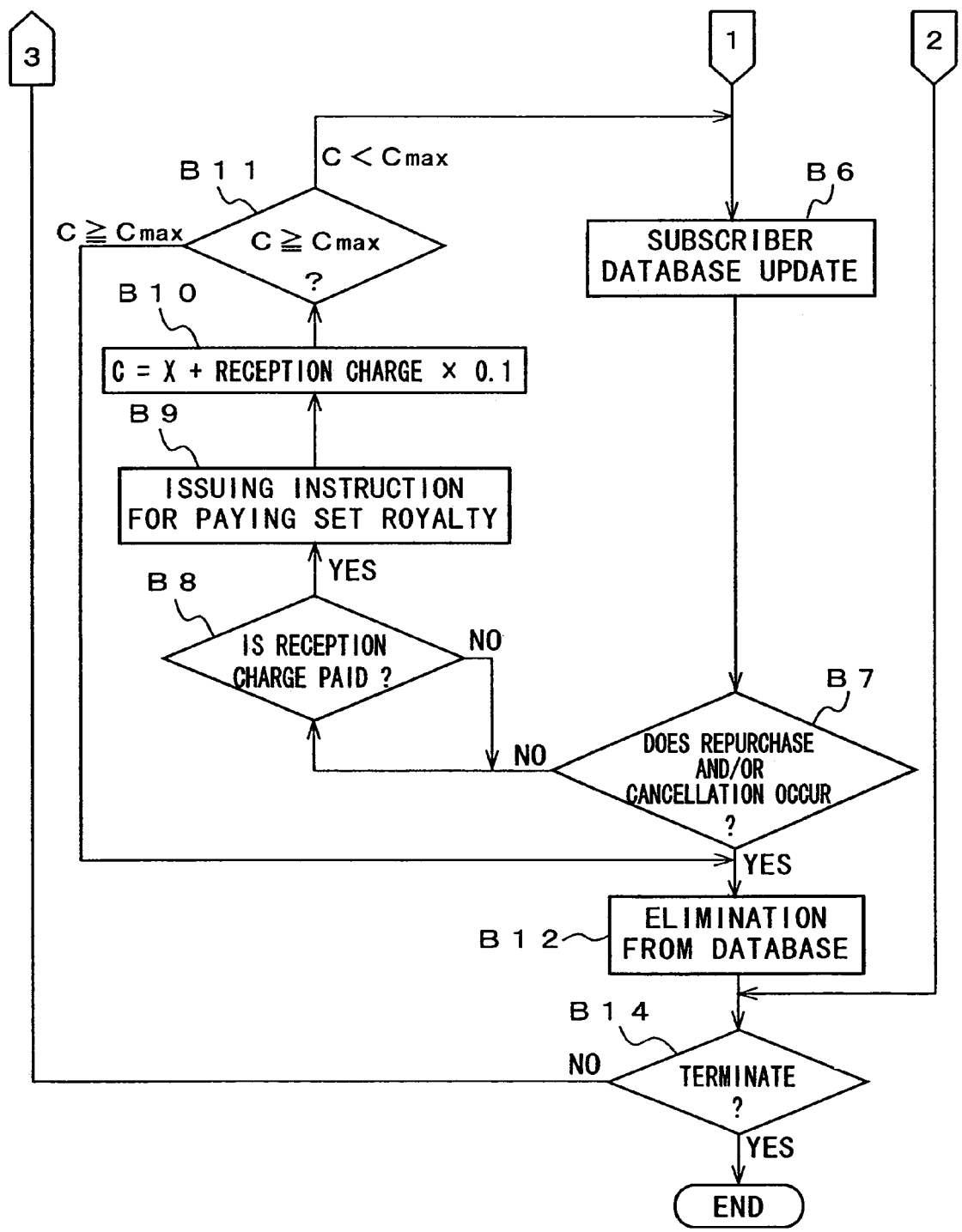

Now, an example of processing in a set royalty system 101 will be described here. FIG. 7 is a flowchart of materials, license and money showing an example of a business model 102 when a set royalty is applied to broadcast businesses. FIGS. 8A and 8B are flowcharts showing example of processing in an accounting server system 20.

In an example of the business model 102 shown in FIG. 7, the above described set royalty business system 101 is applied, and a part manufacturer 42 delivers essential parts 40 to a hardware manufacturer 35, and receives a part payment 41. The hardware manufacturer 35 sells a tuner device 26 (product) to a consumer (user) 14 at a price lower than the desired sales price, and receives a product payment 36. On the other hand, a broadcast service provider 37 makes reception contract concerning charged contents 28 with the user 14, and collects a monthly reception charge 38.

In this example, an accounting server system 20 is provided between the broadcast service provider 37 and the hardware manufacturer 35, and a license agreement is made between the broadcast service provider 37 and the hardware manufacturer 35. Under this license agreement made, hardware manufacture data D1 is transferred from the hardware manufacturer 35 to the accounting server system 20, and the data D1 is updated in a hardware database 24 shown in FIG. 6. From the broadcast service provider 37, reception charge collection data D2 is transferred to the accounting server system 20, and the data D2 is updated in the subscriber database 25. Presumedly, with respect to an amount of money for the difference produced because the hardware manufacturer 35 has provided a tuner device 26 to a user 14 at a low price, a set royalty (monthly) 34 including interest during the license agreement, charge based on the license agreement or the like is returned from the broadcast service provider 37 to the hardware manufacturer 35.

With the above presumption being defined as sales management conditions, in the accounting server system 20, at the step B1 of the flowchart shown in FIG. 8A, the server main body 23 waits for hardware manufacture data D1 transferred from the terminal device 21. When the hardware manufacture data D1 is transferred, processing goes to the step B2. At the step B2, every time the tuner device 26 is manufactured and shipped, the hardware database 24 is updated by the hardware manufacturer 35. Hardware manufacture data D1 concerning the tuner device 26 may be registered every time the hardware manufacture data D1 is shipped or may be registered monthly in all.

Individual tuber devices 26 registered in this hardware database 24 are provided for sales and service subscription of charged contents 28 when the devices are defined as a platform. Therefore, processing goes to the step B3 at which the tuner device 26 is actually sold to the tuner device 26, and waits until charged contents services are subscribed.

For example, at the step A3 in the flowchart shown in FIG. 5, at a shop, the tuner device 26 is forwarded to the user for sale at a price lower than the desired sales price of the hardware manufacturer 35. Then, processing goes to the step A4 at which it is checked whether or not the tuner device 26 sells. In the case where the tuner device 26 does not sell, processing reverts to the step A5 at which the selling is continued. Even when only one tuner device 26 sells, processing goes to the step A5 at which the right of charge for payment of an amount of money for a difference, interest during the license agreement, charge based on the license agreement takes place. On the other hand, in parallel to the manufacture and sales of the tuner device 26, at the step A6 in the flowchart shown in FIG. 5, available charged contents 28 at the tuner device 26 are provided to the user 14.

Then, processing reverts to the flowchart shown in FIG. 8A. At the step B3, when the sales of tuner device 26 and service subscription of charged contents 28 take place, processing goes to the step B4 at which sales information indicating which number of tuner device 26 sells and subscriber information (use information) are input, and correlation (authentication) with record contents of the hardware database 24 is performed. If a tuner device 26 that is not registered in the hardware database 24 is found, there is a possibility of double contract. Thus, processing goes to the step B13 at which countermeasure against illegal act is taken. In the case whether authentication is valid, processing goes to the step B5 at which a server main body 23 issues a status to the hardware database 24, and an attribute with subscriber information is registered together with ID number of the tuner device 26. Then, a flag is set to the tuner device 26 that "earns" a set royalty 34.

Then, processing goes to the step B6 at which a set of subscriber information is registered (accounted) together with ID number of tuner device 26 in the subscriber database 25 as well. This is because the an attribute is provided to tuner device that "earns" the set royalty 34.

Then, processing goes to the step B7 in the flowchart shown in FIG. 8B at which it is checked whether or not the tuner device 26 is repurchased in the subscription contract of the same user 14 accounted in the subscriber database 25 or whether or not subscription is canceled. If an old tuner device 26 is repurchased for a new tuner device 26 and in the case where subscription of charged contents 28 is canceled, processing goes to the step B12 at which the server main body 23 issues a status that instructs cancellation to the hardware database 24 and the subscriber database 25. Thereafter, the tuner device 26 is released from application concerning the set royalty 34, and terminates its role.

On the other hand, at the step B7, in the case where the tuner device 26 is not repurchased or subscription is not canceled, processing goes to the step B8 at which the broadcast service provider 37 waits for monthly reception charge 38 to be paid from the user 14. This reception charge 38 may be settled in all at a specific date and time monthly. When reception charge collection data D2 indicating payment of the reception charge 38 is input by a terminal device 22, at the step B9, the server main body 23 issues to the terminal device 22 of the broadcast service provider 37 an instruction for paying the set royalty to a predetermined account of the hardware manufacturer 35.

The server main body 23 performs processing up to outputting this instruction. Actual transfer processing is entrusted to an electronic commerce system strictly managed by additionally provided security. In addition, the payment of the set royalty 34 may be collected monthly and supervised instead of supervising it in real time.

Thereafter, at the server main body 23, at the step B10, an integrated amount C of money for the past payment of the set royalty 34 is computed by account. An integrated amount C of money for payment is computed by formula (1) below, where an amount of set royalty 34 of the previous month is defined as X, a rate of the set royalty 34 is defined as 10%.

$$C = X + \text{reception charge} \times 0.1 \quad (1)$$

Further, processing goes to the step B11 at which it is checked whether or not an accumulated amount C of money for payment reaches an upper payment limit $C_{max}$ of the set royalty predetermined under a license agreement. This check is made for each tuner device In the case where this accumulated payment amount C does not reach the upper payment limit $C_{max}$ ($C<C_{max}$), processing reverts to the step B6. Therefore, at the step B6, information contained in the subscriber database 25 is updated, and the payment of a next reception charge 38 is waited. Thereafter, the routines at the steps B6 to B11 are repeated, and one tuner device 26 "earns" the set royalty silently.

At the step B11, in the case where the set royalty 34 reaches the payment limit $C_{max}$ ($C \geq C_{max}$), processing goes to the step B12 at which the server main body 23 issues to the hardware database 24 and the subscriber database 25 a status indicating cancellation. Thereafter, the tuner device 26 is released from application concerning the set royalty 34, and terminates its role.

After application is released with respect to the set royalty 34 at the step B12 and after countermeasure against illegal act has been executed at the step B13, processing goes to the step B14 at which it is judged whether or not a set royalty system 101 is terminated. This judgment is made by both of the broadcast service provider 37 and the hardware manufacturer 35. there is a case where the license agreement is terminated by expiration of the contract period and a case the agreement is terminated by cancellation. In the case where there exists a tuner device 26 that "earns" this set royalty 34, and the system 101 is not terminated, processing goes to the step B1 at which the hardware manufacturer 35 manages the tuner device 26 to be manufactured and shipped to shops. Thereafter, the steps B1 to B11 are repeated.

Therefore, the payment of set royalty 34 produced under the license agreement made between the hardware manufacturer 35 and the broadcast service provider 37 can be automatically managed. Moreover, the sales of the tuner device 26 and utilization of charged contents 28 can be promoted. In this manner, the user 14 can obtain the tuner device 26 at a price lower than the desired sales price of the hardware manufacturer 35. As a result of many tuner devices 26 being popular among the users 14, many of the users 14 make contracts with the broadcast service provider 37 concerning charged contents 28. As a result, an increased amount of reception charge 38 is paid from the users to the broadcast service provider 37.

In this way, an increased amount of set royalty 34 is returned from the broadcast service provider 37 to the hardware manufacturer 35. Thus, the sales and profit of each of the hardware manufacturer 35 and broadcast service provider 37 produced under. Moreover, there can be expanded the manufacturing technology field of the tuner device, the technical field of providing the charged broadcast program contents used therefor, and the business scale of the entire information processing medium concerning the third party of the user that uses these tuner device or charged broadcast program contents, which greatly contributes to industrial development.

Figure 9:
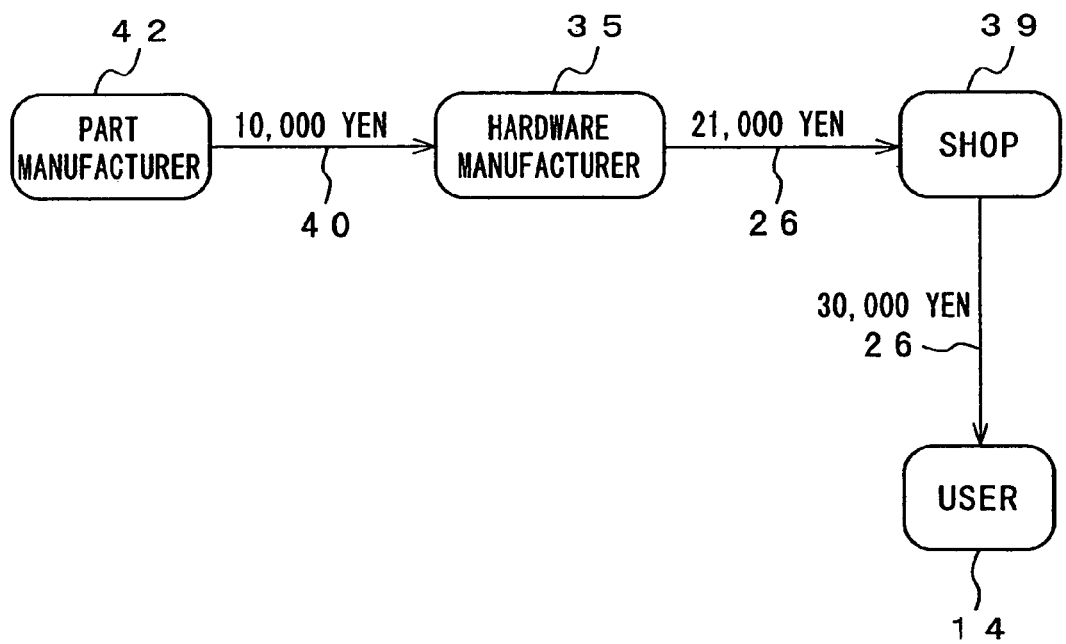
FIG. 9 is an imaginary view of distribution showing an example of setting a sales price in a conventional system that is a comparative example.
Figure 10:
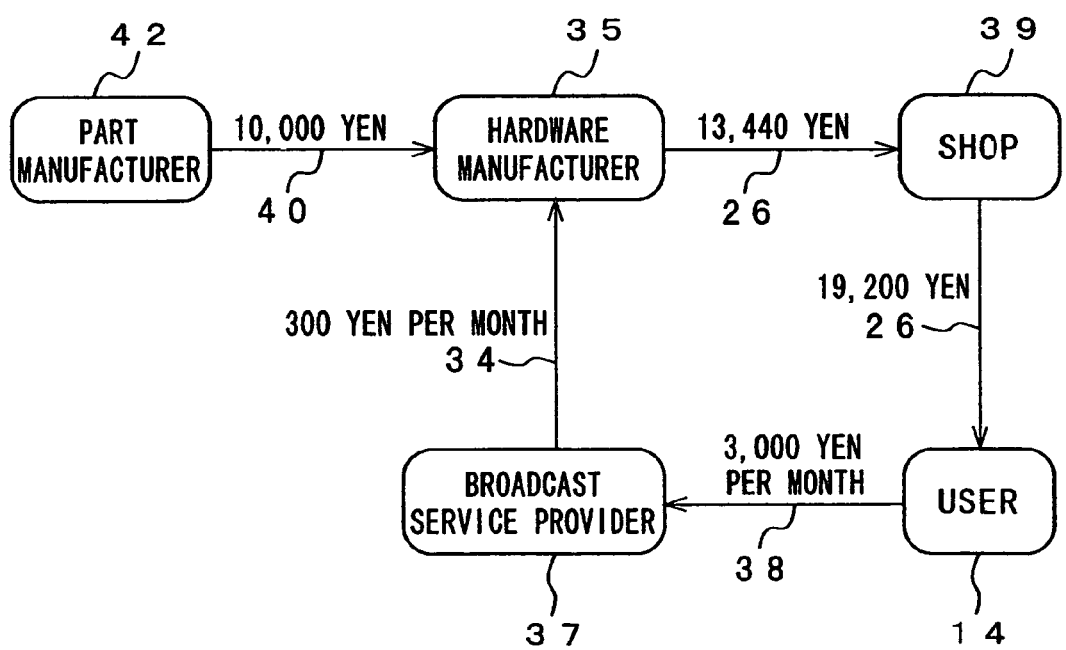
FIG. 10 is an imaginary view of distribution showing an example of setting a sales price in a system according to the present invention.

Here, referring to FIGS. 9 and 10, sales activity management of the tuber device 26 according to the present invention is compared with that according to the conventional system by exemplifying a specific cost.

According to a conventional system that is Comparative Example shown in FIG. 9, there is shown an example in which the hardware manufacturer 35 buys parts of @ 10,000 in unit price from the part manufacturer 42, and a product (tuner device) 26 is shipped to shop 39 at a unit price of @ 21,000 that is about 2.1 times of a material cost (total part cost) obtained by adding processing cost, fixed cost, and profit to this part unit price.

Then, assuming that shop 39 buys the tuner device 26 at 70% of actual sales price (sales price), the user 14 purchases the tuner device at 30,000 Yen. Thus, in order to provide the tuner device 26 to the user 14 at a low price, there are only two way, i.e., reducing the margin of shop so as to further reduce the sales price of the tuner device 26 or reducing the profit of the hardware manufacturer 35 to reduce a shipment cost.

In the system of the present invention shown in FIG. 10, there is shown an example in which the broadcast service provider 37 that is a platform company collects a reception charge 38 from a charged contents subscriber, and 10% of the reception charge 38 is returned as a set royalty 34 to the hardware manufacturer 35. Assuming that the reception charge is 3,000 Yen monthly, the set royalty 34 is 300 yen per month. Assuming that this income can be expected for one year, the hardware manufacturer 35 can obtain 3,600 Yen=300×12 month simply after sales of the tuner device 26. Macroscopically, it is equivalent to the fact that a part price is bought at 6,400 Yen=10,000 Yen−3,600 Yen. When this is shipped from the manufacturer at 2.1 times of the material cost in a way similar to the delivery conditions of the conventional system, the tuner device 26 can be delivered to shop 39 at 13,440 Yen=6,400 Yen×2.1.

In addition, at shop 39, the tuner device 26 is bought at 70% in a way similar to the sales conditions of the conventional system, the tuner device 26 can be forwarded to the user 14 for sale at 19,200 Yen=13,440 Yen/0.7. From the standpoint of the user 14, in comparison with the conventional system, actual purchase price is lowered from 30,000 Yen to 19,200 Yen. Thus, if other manufacture conditions are identical, it is expected that the sales of the tuner device 26 is substantially increased, and its sales quantity significantly increases.

Further, from the standpoint of the part manufacturer 42, the shipment quantity of essential parts 40 simply increases. From the standpoint of the hardware manufacturer 35, the product shipment quantity increases only with after-payment of an amount of money for a difference (a portion of the part cost). In addition, in this example, in the first year and subsequent, a set royalty is further added, and profit increases at that time and subsequent. From the standpoint of the broadcast service provider 37, although 10% of the reception charge 38 is distributed to the hardware manufacturer 35, the number of subscribers significantly increases. Thus, there can be obtained an advantageous effect that the profits of all companies involved in the system 101 increase in viewpoint of economy.

EXAMPLE 2

Figure 11:
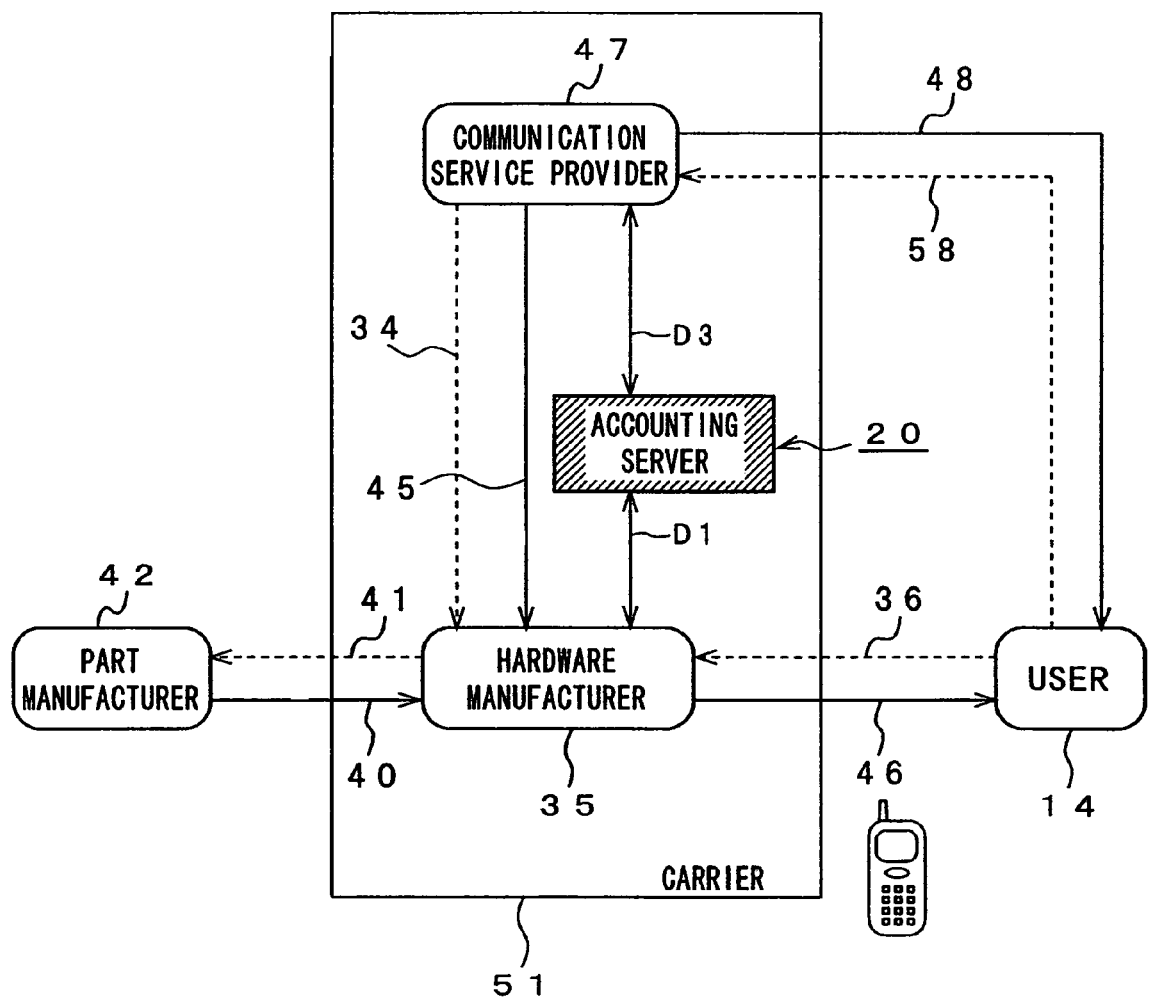
FIG. 11 is a flowchart of materials, license and money showing an example of a business model 103 in which a set royalty according to a second embodiment of the present invention is applied to communication business.

FIG. 11 is a flowchart of materials, license, and money showing a business model example in which a set royalty according to Example 2 of the present invention is applied to communication business.

In an example of a business model 103 shown in FIG. 11, the above described set royalty business system 101 is applied, and the part manufacturer 42 delivers essential parts 40 of a hand held telephone set 46, for example, to the hardware manufacturer 35 and receives a part payment 41. The hardware manufacturer 35 sells a hand held telephone set 46 (product) to a consumer (user) at a price lower than the desired sales price, and receives a product payment 36. On the other hand, a communication service provider 47 makes subscriber contract with a user 14 concerning a telephone call service 48, and collects monthly base charge+ actual telephone call charge 58.

In addition, in this example, an accounting server system 20 is provided between the communication service provider 47 and the hardware manufacturer 35, and a license agreement is made between the communication service provider 47 and the hardware manufacturer 35. Under the license agreement, the communication service provider 47 provides to the hardware manufacturer 35 a technical standard concerning a hand held telephone set 46 in order for the hardware manufacturer to manufacture a hand held telephone set 46 in conformity with communication mode in which a telephone call service 48 is available. Under this license agreement, the hardware manufacturer 35 transfers hardware manufacture data D1 to the accounting server system 20, and the data D1 is updated in a hardware database 24 shown in FIG. 6. The communication service provider 47 transfers telephone call charge collection data D3 to the accounting server system 20, and the data D3 is updated in a subscriber database 25.

With respect to an amount of money for the difference produced because the hardware manufacturer 35 has provided a hand held telephone set 46 to a user 114 at a low price, a set royalty (monthly) 34 including associated interest or charge based on the license agreement or the like is returned from the communication service provider 37 to the hardware manufacturer 35.

Hereinafter, a company that takes a form that an accounting server system 20 is provided between the communication service provider 47 and the hardware manufacturer 35 shown in FIG. 11 is referred to as a carrier 51. With respect to a processing example of the accounting server system 20 in this carrier 51, in the flowchart shown in FIGS. 8A and 8B, broadcast service provider 37 is reread as communication service provider 47; tuner device 26 is reread as hand held telephone set 46; reception charge 38 is reread as base charge+actual telephone call charge 58; and reception charge collection data D2 is reread as telephone call charge collection data D3, whereby processing is executed in a manner similar to business model 102. Therefore, a description of this matter is omitted here.

As has been described above, according to Example 2, the payment of set royalty 34 produced under the license agreement made between the hardware manufacturer 35 and the communication service provider 47 can be automatically managed by an accounting server system 20. Moreover, the sales of the hand held telephone set 46 and utilization of telephone call service 48 can be promoted. In this manner, the user 14 can obtain a hand held telephone set 46 at a price lower than the desired sales price of the hardware manufacturer 35. As a result of many hand held telephone sets 46 being popular among the users 14, many of the users 14 make contracts with telephone call service 48 provided by the communication service provider 47, and an increased amount of base charge+actual telephone call charge 58 is paid from the user 14 to the communication service provider 47.

In this manner, an increased amount of set royalty 34 is returned from the communication service provider 47 to the hardware manufacturer 35. Thus, the sales and profits of the hardware manufacturer 35 and communication service provider 47 can be increased. Moreover, there can be expanded a business scale of the entire information processing medium concerning the manufacturing technology technical field of providing telephone call service 48 applied thereto, and these hand held telephone sets 46 or telephone call service 48 and the like, which greatly contributes to industrial development.

(2) Second Embodiment

Figure 12:
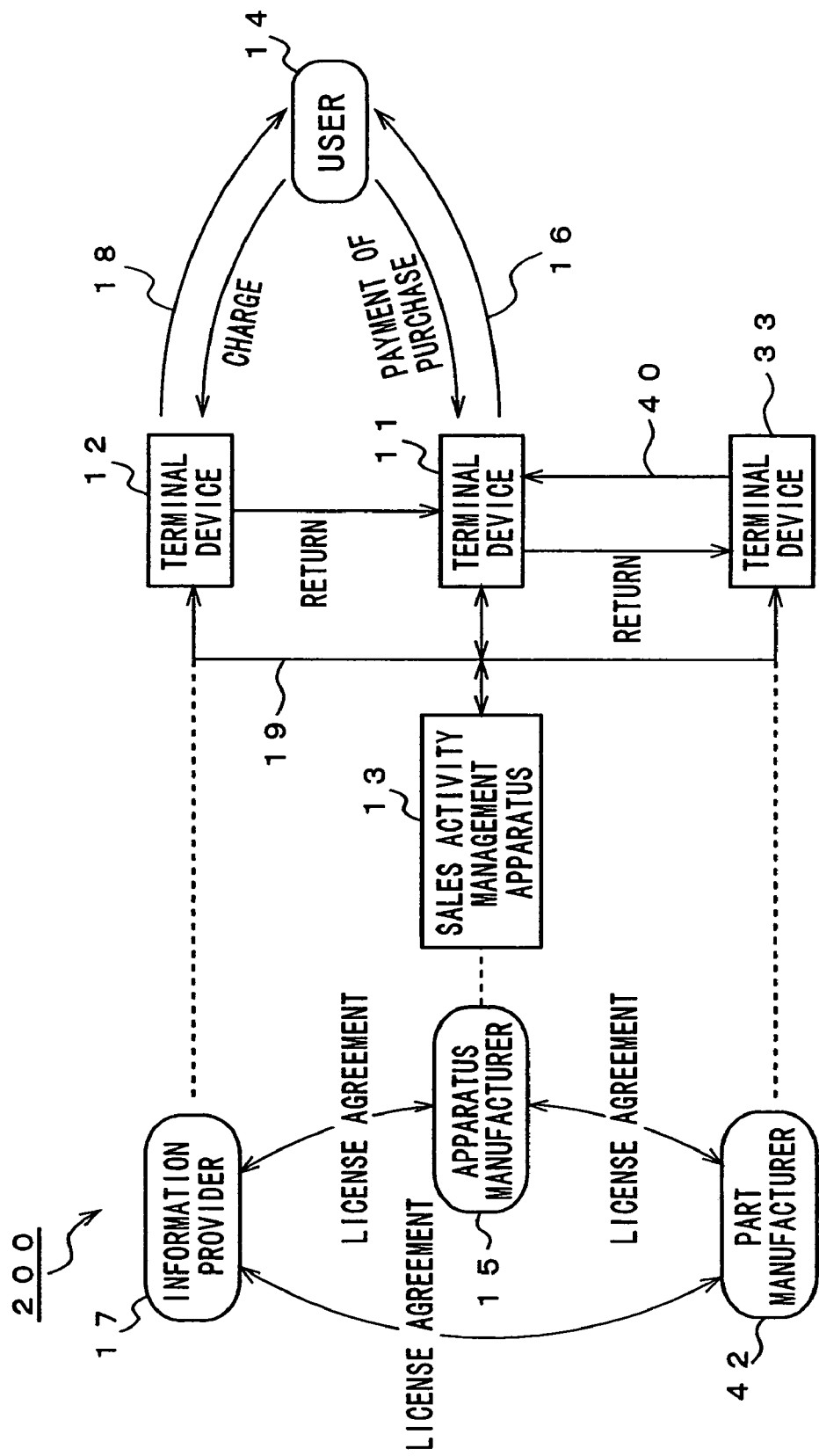
FIG. 12 is a block diagram depicting an exemplary configuration of a sales activity management system 200 that is the second embodiment according to the present invention.

FIG. 12 is a block diagram depicting an exemplary configuration of a sales activity management system 200 according to the second embodiment of the present invention.

In the present embodiment, there is shown a case in which a part manufacturer 42 that manufactures essential parts 40 of an information processing apparatus 16 such as tuner device or hand held telephone set takes part in set royalty business, and sells to an apparatus manufacturer 15 the essential parts 40 to be incorporated in the information processing apparatus 16 at a price lower than the desired sales price of the part manufacture 42. In this case, in a sales activity management apparatus 13 shown in FIG. 12, an amount of money corresponding to a difference produced because the part manufacturer 42 has provided essential parts 40 to the apparatus manufacturer 15 at a low price is managed and controlled so as to be returned from the apparatus manufacturer 15 to the part manufacturer 42 according to an amount of collection of the charge paid from the user to an information provider 17. Like reference numbers and elements in the first embodiment have the same functions. A description of such elements is omitted here.

In a sales activity management system 200 shown in FIG. 12, a license agreement is made among the apparatus manufacturer 15, information provider 17, and part manufacturer 42 with respect to sales of these essential parts 40, information processing apparatus 16 and information contents 18. The license agreement may be made separately between the apparatus manufacturer 15 and the information provider 17 or between the apparatus manufacturer 15 and the part manufacturer 42. With respect to the contents of the license agreement, an amount of money for price of parts provided or part royalty and the like is added to <1> to <8> described in the first embodiment. The part royalty denotes an amount of money including an amount of money for the difference produced because the part manufacturer 42 has provided essential parts 40 at a low price or associated interest, charge based on the license agreement or the like.

The information provider 17 may be a broadcast service provider that provides to a user 14 information contents 18 such as charged broadcast programs, and collects a reception charge from the user 14 in a manner similar to the first embodiment or may be a communication service provider that provides telephone call service to a user 14, and collects a base charge and an actual telephone call charge from the user 14. Further, the information provider 17 may be an information medium seller that manufactures and sells an information medium having information contents 18 such as game software recorded therein to a user 14, and that collects a product payment from the user 14.

In this sales activity management system 200, a part manufacture management terminal device 33 is connected to a communication line 19 described in the first embodiment. At the part manufacturer 42, the essential parts 40 of the information processing apparatus 16 to which a set royalty is applied is manufactured, and a terminal device 33 is managed so as to sell the essential parts 40 to the apparatus manufacturer 15 at a price lower than the desired sales price of the part manufacturer 42.

A sales activity management apparatus 13 is connected to this terminal device 33 through the communication line 19 so that an amount of money to be remitted to the hardware manufacturer is set according to the charge information inputted from the terminal device 12 of the information provider 17. For example, at the sales activity management apparatus 13, an instruction is issued such that an amount of money for the difference produced because the part manufacturer 42 has provided essential parts 40 to the apparatus manufacturer 15 at a low price is remitted from the apparatus manufacturer management terminal device 11 to the part management terminal device 33 according to an amount of collected money for the charge paid from the user 14 to the information provider 17.

With respect to this amount of money corresponding to the difference as described above, apart from a case in which the terminal device 11 issues an instruction to the terminal device 33, the information provision management terminal device 12 may issue an instruction such that the above amount of money is remitted to the part manufacture management terminal device 33. The sales activity management apparatus 13 controls input/output of the above describe apparatus manufacture management terminal device 11, an information provision management terminal device 12 and an part manufacture management terminal device 33 so as to integrally manage delivery information concerning the delivery count of essential parts 40 of the information processing apparatus 16, sales information concerning sales count of the information processing apparatus 16, use information concerning the use count of information contents 18 or the like. A notebook type or desktop type personal computer is used for these terminal devices 11, 12 and 13.

In this sales activity management system 200 as well, the apparatus manufacturer 15 manufactures and manages the information processing apparatus 16 that incorporates essential parts 40 purchased from the part manufacture 42 at a low price. In addition, the terminal device 11 is managed so as to sell the information processing apparatus 16 to the user 14 at a price lower than the desired sales price of the apparatus manufacturer 15.

Figure 13:
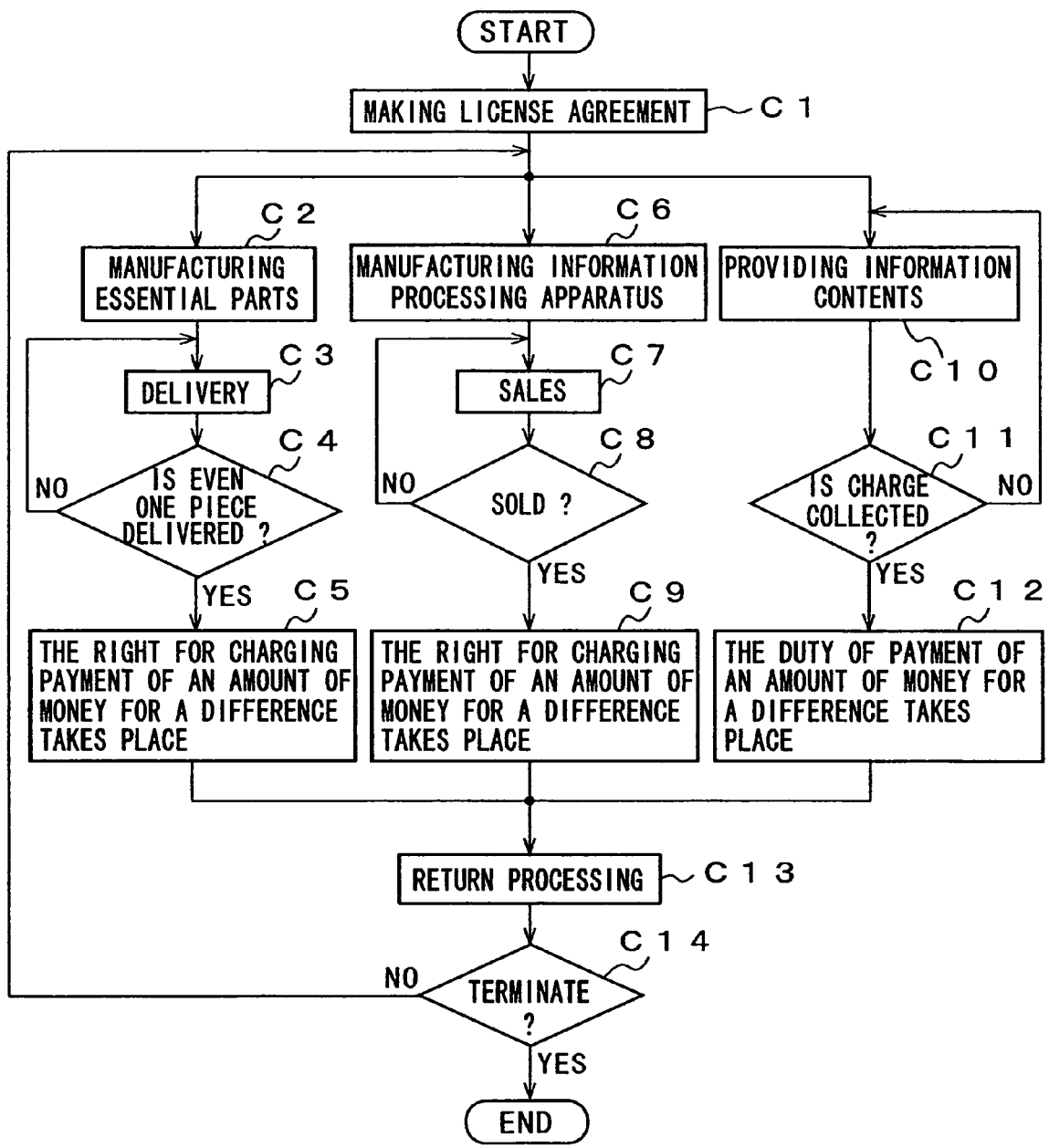
FIG. 13 is a flowchart showing a processing example in the sales activity management system 200.

Now, a processing example of the system 200 will be described with respect to the sale activity management method according to the present invention. FIG. 13 is a flowchart showing a processing example of the sales activity management system 200.

In the present embodiment, assume a case in which the apparatus manufacturer 15 sells to the user 14 the information processing apparatus 16 to which a set royalty is applied, and the information provider 17 sells to the user 14 available information contents 18 at the information processing apparatus 16, and a case in which essential parts 40 of the information processing apparatus 16 are delivered to the apparatus manufacturer 15 at a price lower than the desired sales price of the part manufacturer 42.

In addition, assume that sales activity management apparatus 13 for managing sales activity of the information processing apparatus to which a set royalty is applied is provided based on the license agreement made in advance among the part manufacturer 42, apparatus manufacturer 15 and information provider 17, and an amount of money for the difference produced because the part manufacturer 42 has provided essential parts 40 of the information processing apparatus 16 to the apparatus manufacturer 15 at a low price, the associated interest, and the charge based on the license agreement or the like is remitted from the information management terminal device 12 to the part manufacturer management terminal device 33 via the apparatus manufacture management terminal device 11 according to an amount of money for the charge collected from the user 14.

With this being defined as sales management conditions, at the step C1 of the flowchart shown in FIG. 13, the license agreement concerning the sales of the information processing apparatus 16 and information contents 18 is made among the part manufacturer 42, apparatus manufacturer 15, and information provider 17. With respect to the contents of the license agreement, in addition to <1> to <7> of the first embodiment, an amount of money for part provision price and part royalty or the like are referred to.

Thereafter, at the step C2, the part manufacturer 42 manufactures essential parts 40 to which a part royalty is applied. When the ordered quantity of essential parts 40 is manufactured, processing goes to the step C3 at which the part manufacturer 42 manages the terminal device 33 so as to deliver the essential parts 40 to the apparatus manufacturer 15. Then, the essential parts 40 are delivered to the apparatus manufacturer 1 at a price lower than the desired sales price of the part manufacturer 42.

In the case where even one essential part 40 is delivered to the apparatus manufacturer 15 at the step C4, the delivery count is recorded as part delivery information in the part manufacturer database by using the terminal device 33. In the case where essential parts 40 meeting the ordered quantity is not delivered at the step C4, processing goes to the step C3 at which the delivery of the essential parts 40 is continued. Therefore, when even one part essential part 40 is delivered, processing goes to the step C5 at which a right of charge for payment such as an amount of money for the difference, associated interest, or charge based on the license agreement takes place.

In substantial parallel to manufacture of the essential parts 40, at the step C6, the apparatus manufacturer 15 manages the terminal device 11 so as to manufacture the information processing apparatus 16 incorporating essential parts 40 delivered from the part manufacturer 42 and ship the apparatus to shops. For example, the sales count of the information processing apparatus 16 shipped to shops is grasped as sales information. Then, at the step C7, at shops, the information processing apparatus 16 is forwarded to the user 1 for sales at a price lower than the desired sales price of the apparatus manufacturer 15.

Thereafter, processing goes to the step C8 at which it is checked whether or not the information processing apparatus 16 sells. In the case where the information processing apparatus 16 does not sell, processing reverts to the step C7 at which the sales is continued. When even one information processing apparatus 16 sells, processing goes to the step C9 at which a right of charge for payment such as an amount of money for the difference, associated interest, or charge based on the license agreement takes place.

On the other hand, in parallel to manufacture and sales of the essential parts 40 or information processing apparatus 16 and the like, at the step C10, the information provider 17 provides to the user 14 available information contents 18 at the information processing apparatus 16. Although the charge is collected from the user 14 by provision of the information contents 18, processing goes to the step C11 at which it is checked whether or not the charge of information contents 18 is collected from the user 14. In the case where the charge is not collected from the user 14, processing reverts to the step C12 at which a payment duty of an amount of money for the difference takes place relevant to the sales of the information processing apparatus 16 to which a set royalty is applied.

Then, processing goes to the step C13 at which return processing is done such that the information provider 17 returns to the apparatus manufacturer 15 an amount of money produced because the apparatus manufacturer 15 has provided the information processing apparatus 16 to the user 14 at a low price, according to an amount of money for the charge collected from the user 14. In the second embodiment, the apparatus manufacturer 15 returns to the part manufacturer 42 an amount of money for the difference produced because the apparatus manufacturer 15 has provided essential parts 40 to the apparatus manufacturer 1 at a low price.

Thereafter, processing goes to the step C14 at which it is judged whether or not sales activity management is terminated. This judgment is made through negotiation among the part manufacturer 42, information provider 17 and apparatus manufacturer 15. This is because the benefits of these three parties depend on this judgment. There are a case where the sales activity management is terminated by expiration of the contract period according to the license agreement and a case in which the management is terminated by cancellation. In the case where this sales activity management is not terminated, processing reverts to steps C2, C6 and C10 at which the part manufacturer 42 manufactures essential parts 40, and manages them so as to be delivered to the apparatus manufacturer 15; the apparatus manufacturer 15 manufactures the information processing apparatus 16 having the essential parts 40 incorporated therein, and manages the apparatus so as to be delivered to shops; the information provider 17 provides information contents 18 to the user 14 in parallel to the manufacture delivery and sales of the essential parts 40 and information processing apparatus 16; and the charge is collected from the user 14.

Therefore, the payment of charge produced under the license agreement made between the apparatus manufacturer 15 and the information provider 17 or between the apparatus manufacturer 15 and the part manufacturer 42 can be automatically managed by the sales activity management apparatus 13. Moreover, the sales of essential parts 40, information processing apparatus 16 and its information contents 18 can be promoted. In this manner, as in the first embodiment, the user can obtain the information processing apparatus 16 having essential parts 40 incorporated therein at a price lower than the desired sales price of the apparatus manufacturer 15. As a result of the information processing apparatus 16 incorporating essential parts becoming popular among the users, there are many opportunities that the users use information contents 18 caused by the information provider 17. As a result, it is expected that an increased amount of charge is paid from the user to the information provider 17.

In this manner, an increased amount of money for the difference is paid from the information provider 17 to the apparatus manufacturer 15 and the apparatus manufacturer 15 to the part manufacturer 42. Thus, the sale profit of each of the part manufacturer 42, apparatus manufacturer 15 and information provider 17 can be improved. Moreover, there can be expanded the manufacturing technology field of essential parts 40 and information processing apparatus 16, technical field of providing information contents 18 used therein, and users who uses the information processing apparatus 16 having essential parts therein or information contents 18, which greatly contributes to industrial development.

EXAMPLE 1

Figure 14:
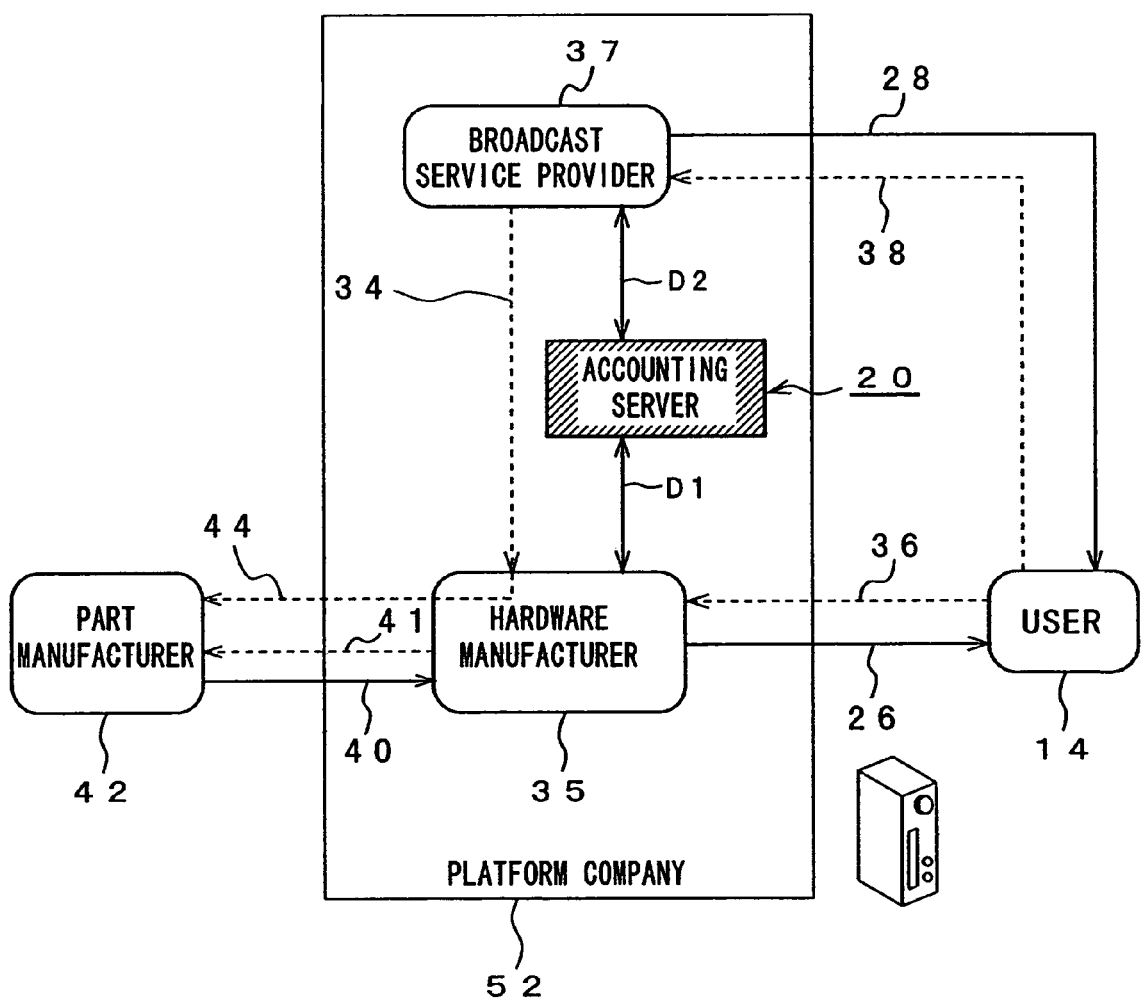
FIG. 14 is a flowchart of materials, license and money showing an example of a business model 201 in which a part royalty that is a first embodiment according to the present invention is applied to broadcast service.

FIG. 14 is a flowchart of materials, license and money showing a business model example when a part royalty that is Example 1 according to the present invention is applied to broadcast service.

In this example, there is shown a model in which part or all of the set royalty 34 is returned as a part royalty 44 to a part manufacturer 42. In this as, in an accounting server system 20, part mount data D4 indicating what essential parts 40 are used for which of the tuner device 26 shipped from the hardware manufacturer 35 is registered and managed by the accounting server system 20.

In an example of the business model 201 shown in FIG. 14, the above described sales activity management system 20 is applied, and the part manufacturer 42 delivers essential parts 40 of the tuner device 26 to a hardware manufacture 35 at a price lower than the desired delivery price, and receives a part payment 41. The hardware manufacturer 35 sells the tuner device 26 (product) containing essential parts to a consumer (user) 14 at a price lower than the desired sales price, and receives a product payment 36. On the other hand, the. broadcast service provider 37 makes a reception contract concerning charged contents 28 with the user 14, and collects a monthly reception charge 38.

In addition, in this example, the accounting server system 20 is provided between the broadcast service provider 37 and the hardware manufacturer 35, and the license agreement is made among the part manufacturer 42, hardware manufacturer 35 and broadcast service provider 37. Under this license agreement, the hardware manufacturer 35 transfers hardware manufacture data D1 to the accounting server system 20, and this data D1 is updated in a hardware database 24 shown in FIG. 6.

This broadcast service provider 37 transfers reception charge collection data D2 to the accounting server system 20, and this data D2 is updated in a subscriber database 25. With respect to an amount of money for the difference produced because the hardware manufacturer 35 has provided the tuner device 26 to the user 14 at a low price, a set royalty (monthly) 34 including the associated interest and the charge based on the license agreement is returned from the broadcast service provide 37 to the hardware manufacturer 35. Further an amount of money for the difference produced because the essential parts 40 of the tuner device 26 have been provided at a price lower than the desired sales price is returned as a part royalty 44 from the hardware manufacturer 35 to the part manufacturer 42.

A company in the form that an accounting server system 20 is provided between the broadcast service provider 37 and the hardware manufacturer 35 shown in FIG. 14 is referred to as a platform company 52. According to the accounting server system 20 in this platform company 52, the payment of the part royalty 44 produced under the license agreement between the hardware manufacturer 35 and the broadcast service provider 37 or between the hardware manufacturer 35 and the part manufacturer 42 can be automatically managed. Moreover, the sales of the essential parts 40, tuner device 26 and its charged contents 28 can be promoted.

Therefore, the user 14 can obtain the tuner device 26 having essential parts 40 incorporated therein at a price lower than the desired sales price of the hardware manufacturer 35. As a result of the tuner device 26 having essential parts incorporated therein becoming popular among the user 14, there is many opportunities that the user 14 utilizes information contents 18 caused by the broadcast service provider 37. As a result, it is expected that an increased amount of the charge is paid from the user 14 to the broadcast service provider 37.

In this manner, an increased amount of money for the difference is returned from the broadcast service provider 37 to the hardware manufacturer 35 and the hardware manufacturer 35 to the part manufacturer 42. Thus, the sales and profit of each of the part manufacturer 42, hardware manufacturer 35 and broadcast service provider 37 can be increased. Moreover, from the standpoint of the broadcast service provider 37 that is a platform, a business risk burdened singly is shared by the hardware manufacturer 35 or part manufacturer 42 so that the risk can be dispersed in the entire associated companies.

Further, there can be expanded a business scale of the entire information processing media concerning the manufacturing technology field of the essential parts 40 and tuner device 26, technical field of providing charged contents 28,used therefor, and information processing apparatus, the technical field of providing the information contents used therefor, and the user 14 that uses the tuner device 26 containing essential parts or charged contents 28 or the like, which greatly contributes to industrial development.

EXAMPLE 2

Figure 15:
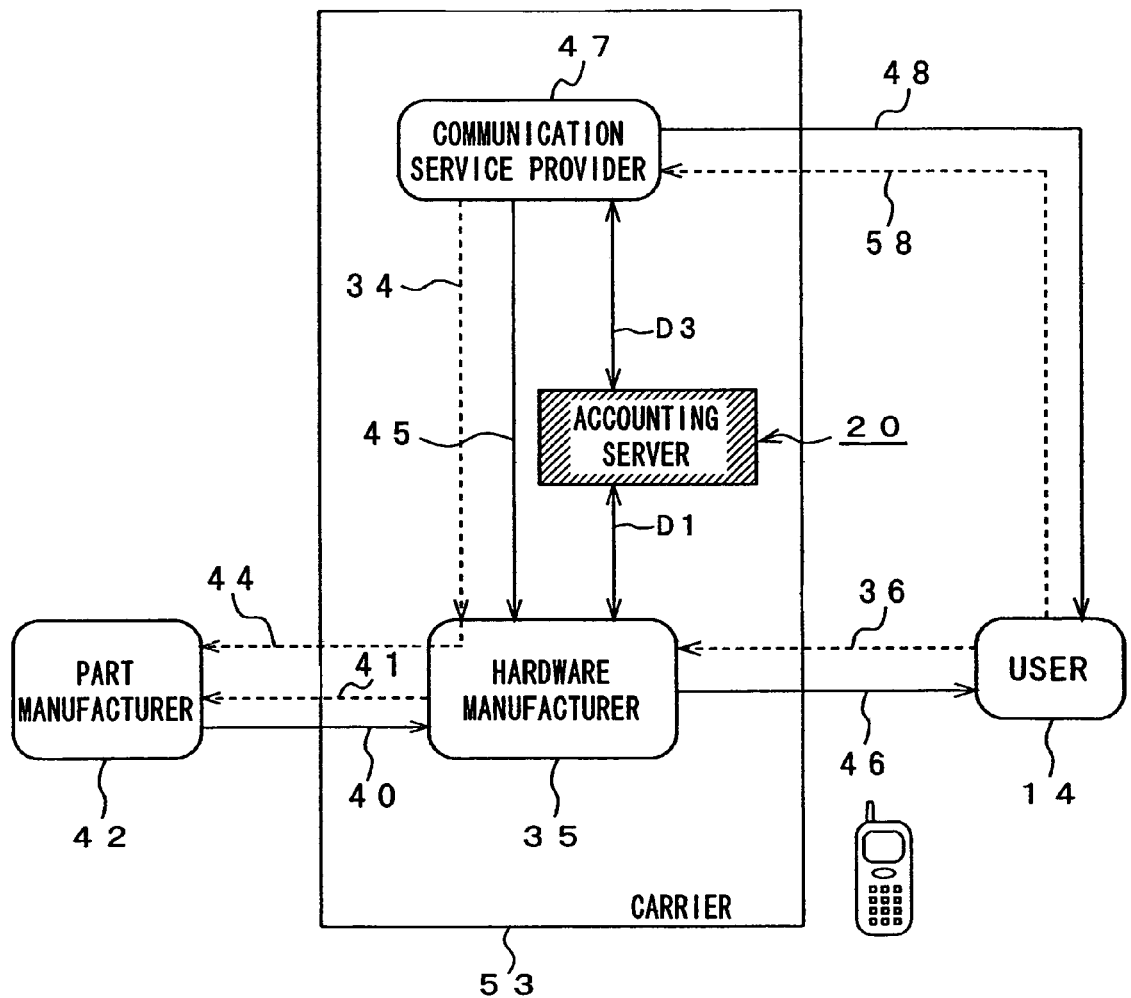
FIG. 15 is a flowchart of materials, license and money showing an example of a business model 202 in which a part royalty according to the second embodiment of the present invention is applied to communication service.

FIG. 15 is a flowchart of materials, license and money sowing a business model example when a part royalty according to Example 2 of the present invention is applied to communication service.

In an example of a business model 202 shown in FIG. 15, the above described sales activity management system 201 is applied. The part manufacturer 42 delivers, for example, essential parts 40 of a hand held telephone set 46 to a hardware manufacture 35 at a price lower than the desired delivery price, and receives a part payment 41. The hardware manufacturer 35 sells a hand held telephone set 46 (product) to a consumer (user) 14 at a price lower than the desired sales price, and receives a product payment 36. On the other hand, the communication service provider 47 makes the subscription contract concerning telephone call service 48 with the user 14, and collects a monthly base charge+an actual telephone call charge 58.

In addition, in this example, an accounting server system 20 is provided between the communication service provider 47 and the hardware manufacturer 35. In addition, the license agreement is made between the part manufacturer 42 and the hardware manufacturer 35 or between the communication service provider 47 and the hardware manufacturer 35. Under the license agreement, there is provided a technical standard concerning a hand held telephone set 46 from the communication service provider 47 to the hardware manufacturer 35 in order to manufacture the hand held telephone set 46 in conformity with the communication mode in which a telephone call service 48 is acceptable. Under this license agreement, the hardware manufacturer 35 transmits hardware manufacture data D1 to the accounting server system 20, and this data D1 is updated in the hardware database 24 shown in FIG. 6. The communication service provider 47 transfers telephone call charge collection data D3 to the accounting server system 20, and this data D3 is updated in the subscriber database 25.

With respect to an amount of money for the difference produced because the hardware manufacturer 35 has provided a hand held telephone set 46 to the user 14 at a low price, a set royalty (monthly) 34 including the associated interest, the charge based on the license agreement and the like is returned from the communication service provider 37 to the hardware manufacturer 35. Further, an amount of money for the difference produced because the essential parts 40 of the hand held telephone set 46 has been provided at a price lower than the desired sales price is returned as a part royalty 44 from the hardware manufacturer 35 to the part manufacturer 42.

According to the accounting server system 20 in a carrier 53 shown in FIG. 15, the payment of a set royalty 34 produced under the license agreement made among the part manufacturer 42, hardware manufacturer 35, and communication service provider 47. Moreover, the sales of the essential parts 40 or hand held telephone set 46 and the like and the utilization of telephone call service 48 can be promoted.

Therefore, the user 14 can obtain a hand held telephone set 46 at a price lower than the desired sales price of the hardware manufacturer 35. As a result of many hand held telephone sets 46 becoming popular among the user 14, there are an increased number of contracts that the user 14 makes telephone call service 48 by the communication service provider 47. As a result, an avoidably increased number of base charge+actual telephone call charge 58 is paid from the user 14 to the communication provider 47.

In this manner, an increased number of set loyalties 34 is returned from the communication service provider 47 to the hardware manufacture 35. An increased number of part loyalties 44 is returned from the hardware manufacturer 35 to the part manufacturer 42. Thus, the sales and profits of each of the part manufacturer 42, hardware manufacturer 35 and communication service provider 47 can be increased. Moreover, there can be expanded a business scale of the entire information processing medium concerning the manufacturing technology field of essential parts 40 and hand held telephone set 46, technical field of providing telephone call service 48 applied thereto, and these hand held telephone sets 46 or telephone call service 48 and the like, which greatly contributes to industrial development.

(3) Third Embodiment

Figure 16:
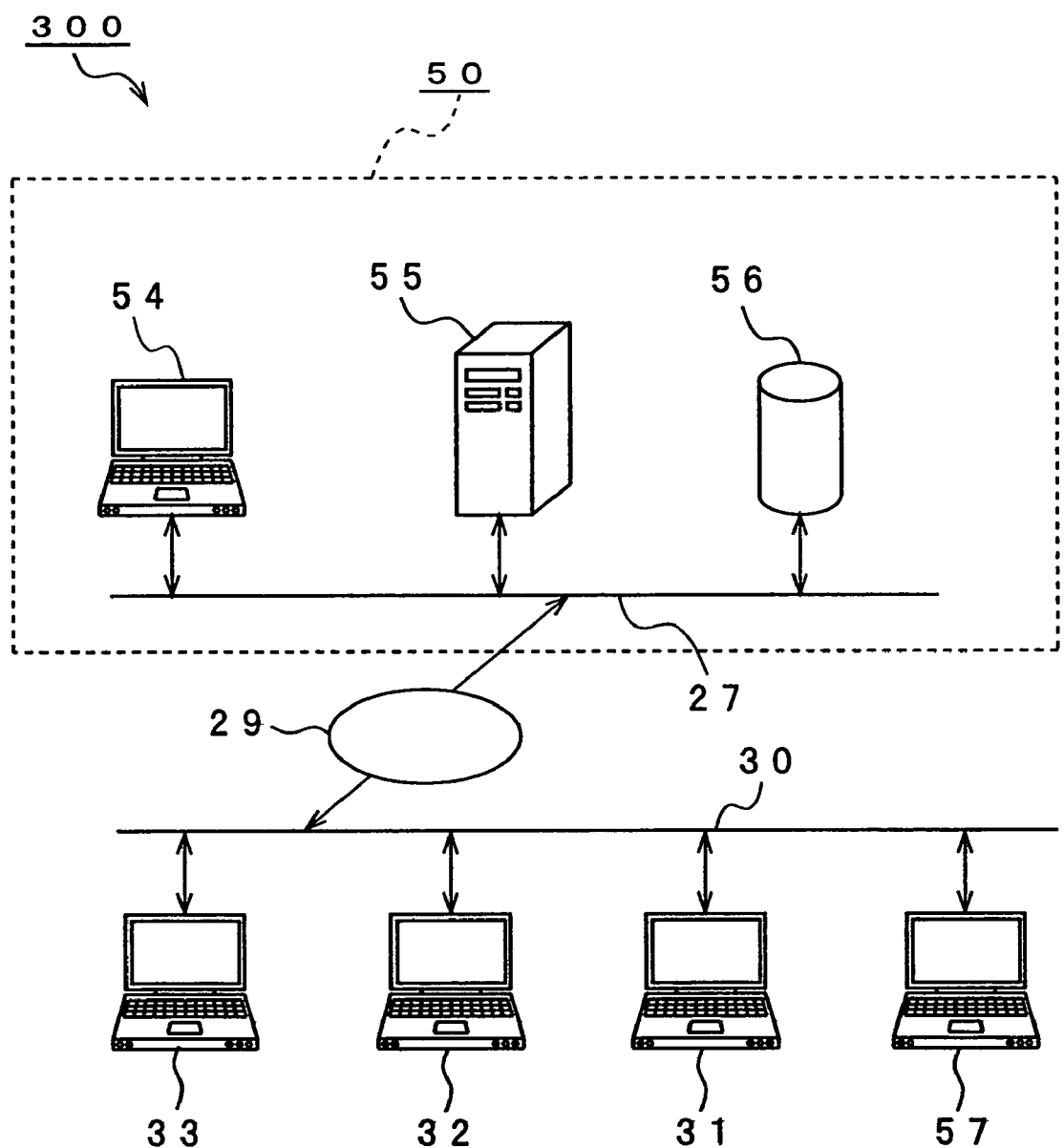
FIG. 16 is a block diagram depicting an exemplary configuration of a device royalty business system that is a third embodiment according to the present invention.

FIG. 16 is a block diagram depicting an exemplary configuration of a device royalty business system 300 that is a third embodiment according to the present invention.

In the present embodiment, there is shown a case in which a license agreement is made between an information medium seller (hereinafter, referred to as a software manufacturer) and a hardware manufacturer. In addition, an accounting server system 50 is installed in a hardware manufacturer that is a format holder (license holder), and the part royalty described in the second embodiment is introduced into the system 300. The software manufacturer is a company that pays software royalty to the hardware manufacturer, manufactures an information recording medium recording game software or the like that is an example of information contents, sells the information recording medium to the user 14, and collects a product payment to the user 14.

In a device royalty business system 300 shown in FIG. 16, an accounting server system 50 is provided. In the case where a game machine for game software that is an example of an information processing apparatus manufactured based on its own license is forwarded to the user for sales from the hardware manufacturer, and in the case where available game software at the hardware manufacturer is forwarded to the user for sales from the software manufacturer, a device royalty is managed based on the license agreement made in advance between the hardware manufacturer and the software manufacture or the license agreement made between the part manufacturer and the hardware manufacturer. The device royalty is a concept formed by combining the software royalty and part royalty. The software royalty has the substantially same meaning as set royalty.

This accounting server system 50 has a local network 27. To this local network 27, there is connected a accounting server terminal device 54 that is an example of operation means. This terminal device 54 is installed at the hardware manufacturer's manufacturing site or head office that is a format holder, and is used for manufacture and management of a game machine. This terminal device 54 is operated so as to input product shipment information concerning the manufacture count of the game machine. This manufacture shipment information is generated when a game machine is manufactured by the hardware manufacturer or when the game machine is shipped to shops.

To this terminal device 54, there is connected a part manufacturer database 56 that is an example of storage means through a local network 2. In a part manufacturer database 56 base on the delivery of essential parts 40 from the part manufacturer, part delivery information is recorded at the hardware manufacturer so that its contents are updated. At this time, sales information (sales result information) concerning the sales quantity of game machine may be updated.

At this accounting server system 50, there is provided a server main body 55 that is an example of management control means so that an amount of money to be remitted to the hardware manufacturer is set according to game software sales information inputted from a software manufacturer terminal device 57. For example, in the server main body 55, with respect to an amount of money for the difference produced because the hardware manufacturer has provided the game machine to the user at a low price, a software royalty containing the associated interest or the charge based on the license agreement is managed and controlled so as to be returned from the software manufacturer to the hardware manufacturer. Specifically, the server main body 55 issues an instruction so that the software manufacturer returns the software royalty to the hardware manufacturer or so that the hardware manufacturer returns a part royalty to a part manufacturer.

In this example, according to the product payment of game software collected from the user, the software royalty is paid from the software manufacturer to the hardware manufacturer based on part delivery information stored in the part manufacturer database 56, the license agreement made in advance between the hardware manufacturer and the software manufacturer, and the license agreement made between the part manufacturer and the hardware manufacturer, and a part royalty is paid from the hardware manufacturer to the part manufacturer. These payments are made so as to be automatically managed and controlled by the server main body 55.

To this accounting server system 50, a communication network 29 such as Internet, telephone line or satellite line is connected as in the first embodiment, and a public network 30 is connected. A software manufacture terminal device 57 is connected to this public network 30 so that game software applicable to the game machine to which a device royalty is applied is managed to be forwarded to the consumer for sales The terminal device 57 is installed at the software manufacturer. The software manufacturer manufactures game software and sells it to the user based on the license agreement made with the hardware manufacturer. Therefore, the software manufacturer is liable for the payment of software royalty to the hardware manufacturer.

To this public network 30, a sales department terminal device 31 as well as terminal device 57 is connected as in the first embodiment. Then, the game machine to which a device royalty is applied is managed so as to be forwarded to the consumer for sales at a price lower than the desired sales price of the hardware manufacturer. Although sales information (sales result information) concerning sales quantity of game machines sold to the consumers is not required to be updated unlike the first embodiment, the information is updated in the part manufacturer database 56 in order to correlate with essential parts.

Further, the manufacturing department terminal device 32 and part manufacturer terminal device 33 are connected to the public network 30. Then deliver information concerning delivery count of essential parts for the game machine or product shipment information concerning shipment count of the game machine are transferred to the part manufacturer database 56. The server main body 55 controls input/output of the above mentioned five terminal devices 31, 32, 33, 54 and 57 connected via a local network.27, a communication network 29, or a public network 30 and the like so as to integrally manage delivery information concerning the delivery count of essential parts of the game machine or information concerning payment state of software royalty. A notebook type or desktop personal computer is used for terminal devices 31, 32, 33, 54 and 57.

Figure 17:
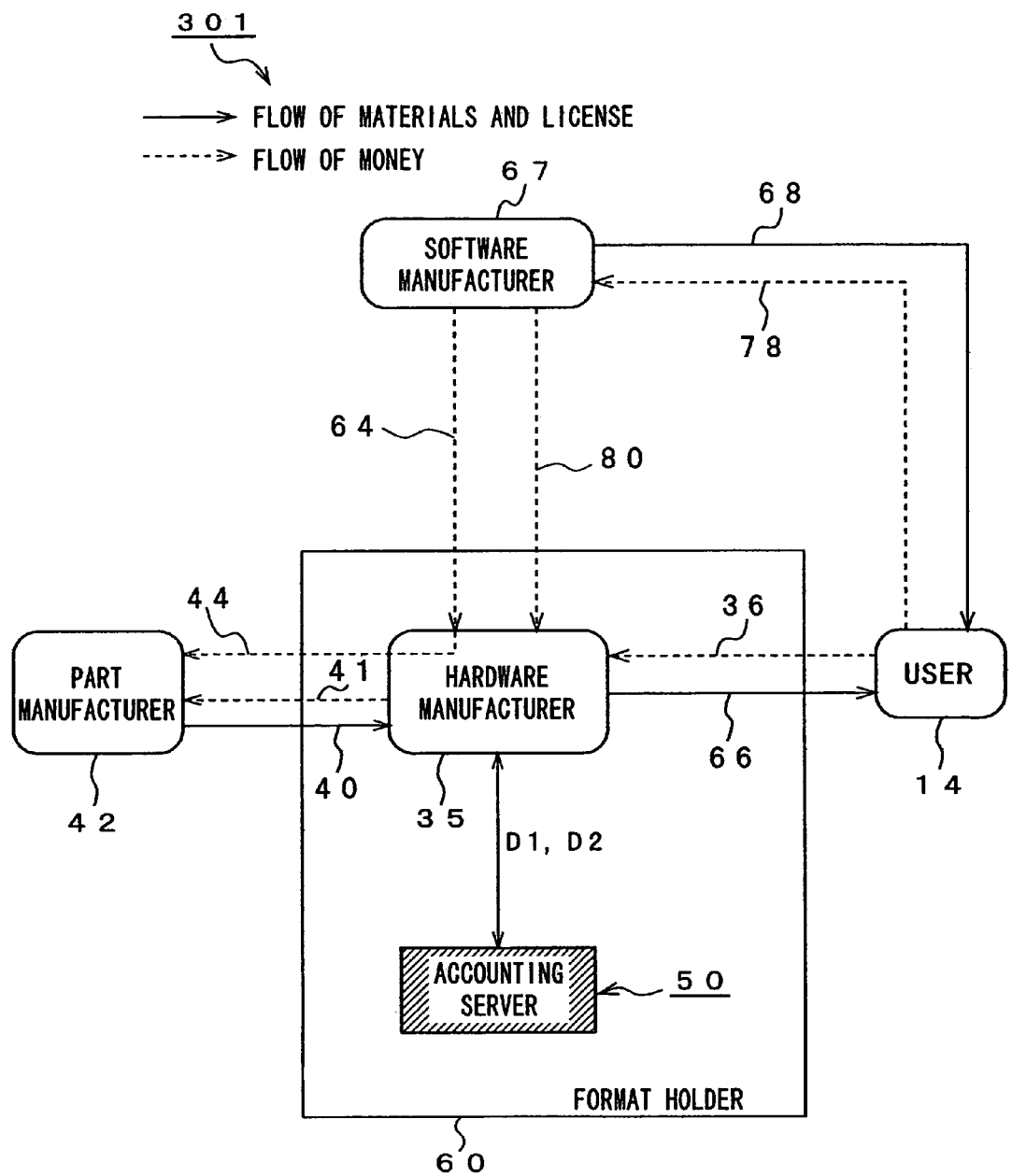
FIG. 17 is a flowchart of materials, license and money showing an example of a business model 301 concerning the same machine and game software sales activities that is an example according to the present invention.
Figure 18A:
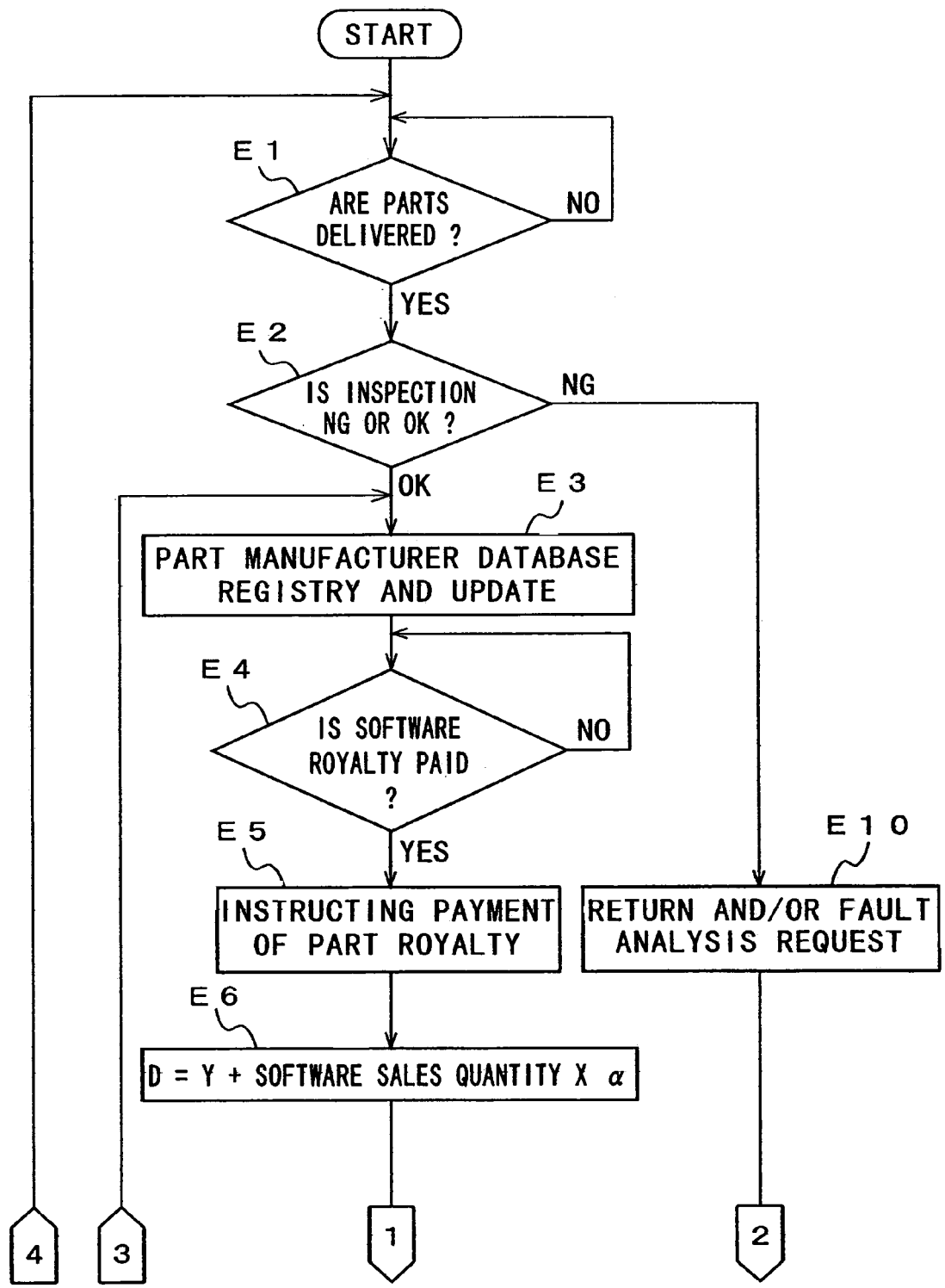
FIGS. 18A and 18B are flowcharts showing a processing example in the accounting server system 50.
Figure 18B:
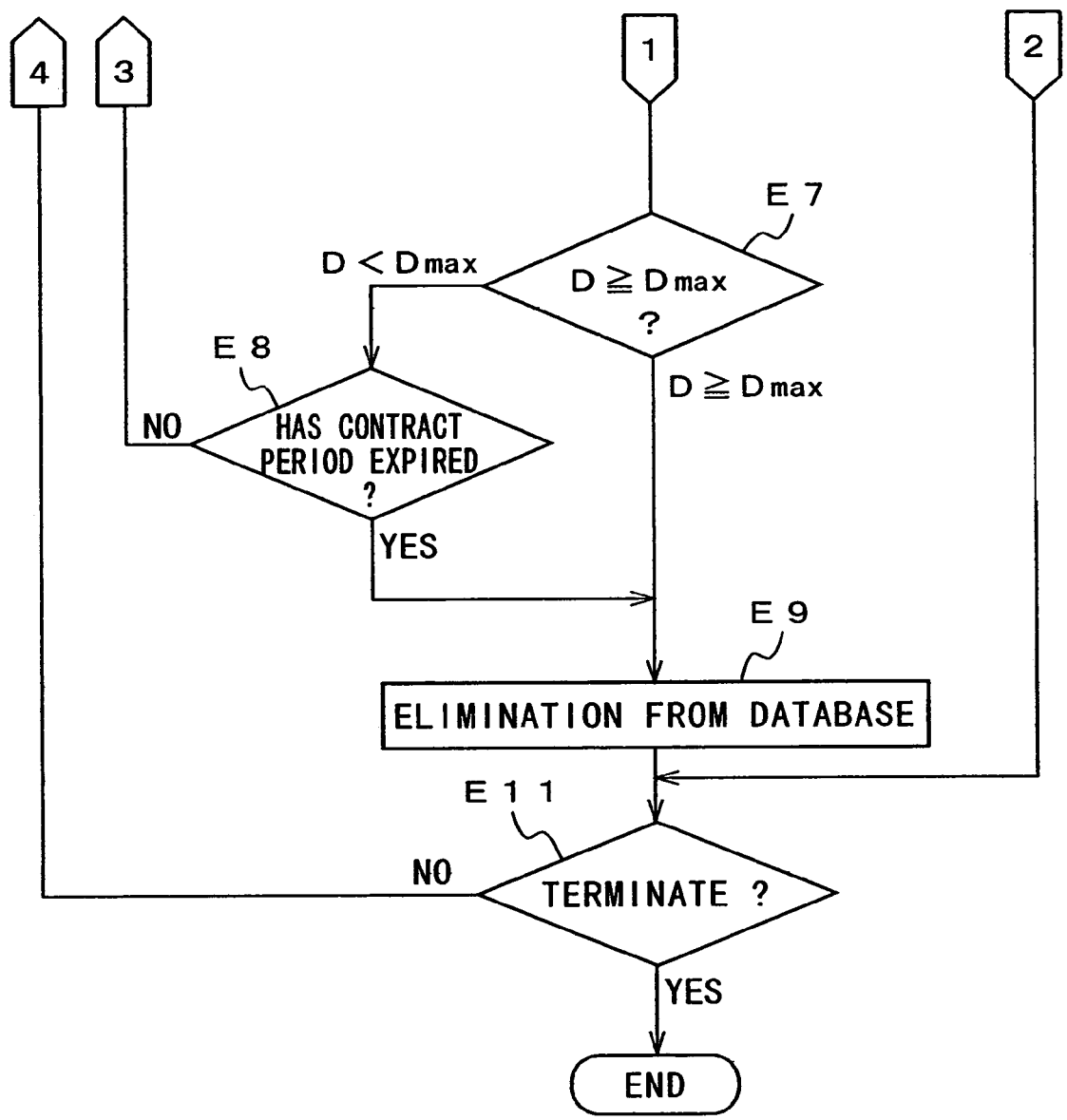

Now, a processing example of a device royalty system 300 will be described here. FIG. 17 is a flowchart of materials, license and money showing an example of a business model 301 concerning a game machine and game software sales business that are examples according to the present invention. FIGS. 18A and 18B are flowcharts showing processing examples 1 and 2 of the accounting server system 50.

In these examples, there is shown a model for returning part of software royalty 64 as a part royalty 44 to a part manufacturer 42. In the business model 301 shown in FIG. 17, the above described device royalty business model 300 is applied. Then the part manufacturer 42 delivers essential parts 40 of the game machine 66 to the hardware manufacturer at a price lower than the desired delivery price, and receives a part payment 41. The hardware manufacturer 35 sells the game machine 66 (product) having essential parts incorporated therein to the consumer (user) 14 at a price lower than the desired sales price, and receives a product payment 36. On the other hand, the software manufacturer 67 sells game software to the user 14, and receives a product payment.

In this example, an accounting server system 50 is provided to the hardware manufacturer 35 that is a format holder 60. In addition, a license agreement is made between the part manufacturer 42 and the hardware manufacturer 35, and a license agreement 80 is made between the hardware manufacturer 35 and the software manufacturer 67. In the accounting server system 50, there is stored hardware manufacture data D1 indicating the type, quantity and time of information processing apparatus (set) such as game machine 66 delivered in market and the contents of payment of part royalty 44 between the hardware manufacturer 35 and each part manufacturer 42. In addition, detailed data concerning the payment state of software royalty 64 from the software manufacturer 67 is registered in the accounting server system 50.

This software manufacturer 67 transfers software sales data D5 to the accounting server system 50, and (this data D5 is updated in the part manufacturer database 56). With respect to an amount of money for the difference produced because the hardware manufacturer 35 has provided the game machine 66 at a price lower than the user 14, the software royalty (monthly) 64 including the associated interest and the charge based on the license agreement 80 is returned from the software manufacturer 67 to the hardware manufacturer 35. Further, an amount of money for the difference produced because essential parts 40 of the game machine 66 has been delivered at a price lower than the desired sales price is returned as a part royalty 44 from the hardware manufacturer 35 to the part manufacturer 42.

Presumedly, at the step E1 that is a flowchart shown in FIG. 18A, when the part manufacturer 42 making a license agreement concerning a part royalty 44 delivers targeted essential parts 44 to the hardware manufacturer 35, processing goes to the step E2 at which inspection check is performed. This inspection check may be made collectively monthly, for example, even if essential parts 40 are supervised in a real time. Then, processing goes to the step E10 at which essential parts 40 in which faults are found during inspection check are returned to the part manufacturer 42, and processing such as request for fault analysis is implemented as required.

Essential parts 40 in which inspection check is acceptable (OK) at the step E2, is registered in a part database 56 of an accounting server system 50 at the step E3. Items to be registered in this database 56 include the type, price, and time of parts delivered from each part manufacturer and the contents of the license agreement concerning a part royalty 44 made between the hardware manufacturer 35 and the part manufacturer 42. These items of information are stored in the database 56.

Thereafter, processing goes to the step E4 at which the software manufacturer 67 waits for payment of the software royalty 64. When payment of the software royalty 64 occurs, an instruction for paying part of the software royalty 64 to a predetermined account of the part manufacturer 42 in accordance with the contents of the license agreement is issued from the accounting server system 50 to the terminal device 33 of the part manufacturer 42 or the like. The accounting server system 50 performs processing until this instruction has been outputted.

Actual transfer processing is entrusted to an E-commerce system strictly managed in additionally provided security. In addition, the payment of software royalty 64 may be processed collectively monthly and supervised instead of supervising it in a real time.

Thereafter, in the server main body 55 of the accounting server system 50 at the step E6, the integrated past payment amount D of the part royalty 44 is calculated by account. The integrated payment amount D is computed by formula 2, where an amount of part royalty 44 of the previous month is defined as Y and the part royalty 44 is defined as α Yen per software.

$$D = Y + \text{software sales quantity} \times \alpha \quad (2)$$

Further, processing goes to the step E7 in the flowchart shown in FIG. 18B at which it is checked whether or not the integrated payment amount D reaches payment limit D max of part royalty 44 predetermined under the license agreement. This check is made for each game machine. In the case where this integrated payment amount D does not reach the payment limit D max of the part royalty 44 (D<D max), processing goes to the step E8 at (which it is checked whether or not the contract period of the license agreement has expired). In the case where the contract period has expired, processing goes to the step E3. Therefore, at the step E3, information on the part manufacturer database 56 is updated, and the payment of the next software royalty 64 is waited. Thereafter, the routines at the steps E3 to E8 are repeated, and one essential part 40 "earns" part royalty 44 silently.

In the case where the payment amount of the part royalty 44 reaches payment limit D max at the step E8 (D≧D max), processing goes to the step E9 at which the server main body 55 issues a status for indicating cancellation to the part manufacturer database 56. Thereafter, the essential parts 40 are released from application concerning the part royalty 44, and terminates its role.

After application is released with respect to a part royalty 44 at the step E9, and after processing corresponds to return and/or fault analysis request or the like at the step E10, processing goes to the step E11 at which it is judged whether or no a device royalty system 301 is terminated. This judgment is made by both of the part manufacturer 42 and the hardware manufacturer 35.

There is a case where the system is terminated by expiration of the contract period according to this license agreement or a case where the system is terminated by cancellation. In the case where there exists essential parts 40 that "earn" the part royalty 44, and the system 301 is not terminated, processing reverts to the step E1 at which the hardware manufacturer 35 receives delivery of essential parts 40 to which the part royalty 44 is applied to part manufacture 42, manufactures a game machine 66, and manage the game machine so as to be shipped to shops. Thereafter, the steps E1 to E9 are repeated.

In this way, in an accounting server system 50 according to the third embodiment of the present invention, the software manufacturer 67 pays to the part manufacturer 42 part of the software royalty as a part royalty in accordance with the contents of the contract on part royalty payment. The part manufacturer 42 can expect a part royalty income; and thus, can deliver essential parts 40 or the like of the game machine 66 at a low price. The hardware manufacturer 35 can procure the essential parts 40 at a low price, and thus, can reduce a set of sales price for the user.

Therefore, the part manufacturer 42 can obtain a part royalty that has not been obtained in conventional hardware business, and thus, can sell the game machine 66 at a lower price than the desired sales price in comparison with a conventional system. Assuming that other manufacturing conditions or the like are totally identical those of the conventional system, in the device royalty business system 300 of the present invention, an increased number of game machines 66 sells. As a result, the number of subscribers as well is increased, which is preferable.

In addition, the payment of the software royalty 64 produced under the license agreement made between the hardware manufacturer 35 and the software manufacturer 67 or the payment of the part royalty 44 produced under the license agreement between the hardware manufacturer 35 and the part manufacturer 42 can be automatically managed by the accounting server system 50. Moreover, the sales of the essential parts 40, game machine 66 and its game software 68 can be promoted.

Further, the user 14 can obtain the game machine 66 having essential parts 40 incorporated therein at a lower price than the desired sales price of the hardware manufacturer 35. As a result of the game machine 66 having essential parts incorporated therein becoming popular among the users 14, the users 14 purchase the game software 68 caused by the software manufacturer 67 more frequently. As a result, it is expected that an increased amount of product payment 78 is paid from the user 14 to the software manufacturer 67.

In this manner, an increased amount of the software royalty 64 is returned from the software manufacturer 67 to the hardware manufacturer 35, and an increased amount of the part royalty 44 is returned from the hardware manufacturer 35 to the part manufacturer 42. Thus, the sales and profits of each of the hardware manufacturer 35 and software manufacturer 67 can be increased. Moreover, there can be expanded a business scale of the entire information processing media concerning the manufacturing technology field of the essential parts 40 and the game machine 66; the technical field of providing the game software 68 used therefor, and the users 14 using the game machine 66, having essential parts incorporated therein or game software 68 and the like, which greatly contribute industrial development.

Here, sales activity management systems of the game machine 66 (hereinafter, referred to as a "set") and game software (hereinafter, referred to as "software") according to prior art and the present invention are compared with each other by exemplifying a specific cost.

<1> Specific Example of the Cost and Sales Profit in the Prior Art
A total of part delivery price A: @ 10,000 Yen
A total of part original price B: ½ of A=@ 5,000 Yen
A set sales price C: Twice of A=@ 20,000 Yen This set sales price includes processing cost, management cost, distribution margin, profit or the like
Software sales price D: @5,000 Yen
Software royalty E: 1,000 Yen per software In the above described manufacturing sales conditions, assuming that a set of 1,000,000 is sold, and 10 software components are sold per set, the set and rough profit are as followed.
Set sales F;

$$20,000\ \text{Yen}(C) \times 1,000,000 = 20,000,000,000\ \text{Yen}$$

Set rough profit G:

$$@10,000\ \text{Yen}(C-A) \times 1,000,000 = 10,000,000\ \text{Yen}$$

This set rough profit G includes management cost and distribution margin or the like.
Part sales H:

$$@10,000\ \text{Yen}(A) \times 1,000,000 = 10,000,000,000\ \text{Yen}$$

Part rough profit I:

$$@5,000\ \text{Yen}(A-B) \times 1,000,000 = 5,000,000,000\ \text{Yen}$$

Software sales J:

$$@5,000\ \text{Yen}\ (D) \times 1,000,000 \times 10 = 50,000,000,000\ \text{Yen}$$

Software royalty profit K:

$$@1,000\ \text{Yen}(E) \times 1,000,000 \times 10 = 10,000,000,000\ \text{Yen}$$

That is, in this business, the sales and rough profit of each manufacturer are as follows:
Format holder (hardware manufacturer)

Sales $L$: $F+K=30,000,000,000$ Yen

Rough profit $M$: $G+K=20,000,000,000$ Yen

Software manufacturer

Sales $N$: $J=50,000,000,000$ Yen

Rough profit $O$: $J-K=40,000,000,000$ Yen

Part manufacturer

Sales $P$: $H=10,000,000,000$ Yen

Rough profit $Q$: $I=5,000,000,000$ Yen

<2> Specific Example of Cost and Sales Profit in a System According to the Present Invention
Part delivery price total A': @6,000 Yen
Part original price total B:

½ of A=@5,000 Yen (same as the conventional system)

Set sales price C': Twice of A=@12,000 Yen

This set sales price includes processing cost, management cost, distribution margin, profit and the like.
Software sales price D: @5,000 Yen (same as above)
Software royalty E:

@1,000 Yen per soft ware (same as above)

Part royalty R: @400 Yen per software

In the above described sales conditions, the set sales price is reduced to A'/A=1×0.6. Thus, assuming that another conditions are totally similar to the conventional system, it can be expected that the sales will be the second power of this inverse number, Therefore, it can be expected that the number of sales which was assumed to be 1,000,0000 in the conventional system increase to $(1/0.6)^2 \times 1,000,000 = 2,780,000$. Assuming that 10 software components are sold per set, the sales and rough profit of each manufacturer are as follows:
Set sales F':

$$@12,000\ \text{Yen}(C) \times 2,780,000 = 33,400,000,000\ \text{Yen}$$

Set rough profit G':

$$@6,000\ \text{Yen}(C'-A') \times 2,780,000 = 16,700,000,000\ \text{Yen}$$

This set rough profit includes processing cost, management cost and distribution margin or the like.
Part sales H':

$$@6,000\ \text{Yen}(A') \times 2,780,000 = 16,700,000,000\ \text{Yen}$$

Part rough profit I':

$$@1,000\ \text{Yen}(A'-B) \times 2,780,000 = 2,800,000,000\ \text{Yen}$$

Software sales J':

$$@5,000\ \text{Yen}\ (D) \times 2,780,000 \times 10 = 139,000,000,000\ \text{Yen}$$

Software royalty income K':

$$@1,000\ \text{Yen}\ (E) \times 2,780,000 \times 10 = 27,800,000,000\ \text{Yen}$$

Part royalty income S:

$$@400\ (R) \times 2,780,000 \times 10 = 11,100,000,000\ \text{Yen}$$

That is, according to the system of the present invention, the sales and rough profit of each manufacturer are as follows.
Format holder (hardware manufacturer 35)

Sales $L'$: $F'+K'=61,200,000,000$ Yen

Rough profit $M'=G'+K'-S=33,400,000,000$ Yen

Software manufacturer 67

Sales $N'$: $J'=139,000,000,000$ Yen

Rough profit $O'=J'-K'=111,200,000,000$ Yen

Part manufacturer 42

Sales $P'$: $H'=16,700,000,000$ Yen

Rough profit $Q'$: $I'+S=13,900,000,000$ Yen

In this manner, in comparison with the prior art and the present invention, a number of set sales can be increased to about 2.8 times, and thus, the sales and rough profit the hardware manufacturer 35, software manufacturer 67 and part manufacturer 42 can be increased. Moreover, the hardware manufacturer 35 can manufacture the same game machine 66 at a low price. The number of manufactures can be increased, and thus, repayment of the fixed manufacturing cost can be accelerated.

In addition, according to the hardware manufacturer or part manufacturer in the prior art, there can be constructed a new profit structure that, even if nothing is produced as long as the license agreement on business terminated after shipping essential parts 40 or set continues, the income of the software royalty 64 or part royalty 44 can be continuously obtained. If other manufacturing parts are manufactured at a manufacturing infrastructure at which this repayment terminates, the profit structure can be improved in a synergetic effect manner.

Therefore, in each of the manufacturers, a stable income can be obtained over the several years from the viewpoint of management. In addition, there can be obtained motivation that the hardware manufacturer 35 and part manufacturer 42 take part in the spread of format.

As has been described above, in the sales activity management system according to the present invention, in the case where an apparatus manufacturer sells an information processing apparatus to a user, and an information provider sells available information contents at the information processing apparatus to the user, there is provided a sales activity management apparatus, wherein an amount of money to be remitted to the apparatus manufacturer is set according to charge information inputted from an information provision terminal device.

With this configuration, for example, the payment of the charge produced under a license agreement between the apparatus manufacturer and the information provider can be automatically managed. Moreover, the sales of the information processing apparatus and information contents can be promoted. In this manner, the user can obtain the information processing apparatus at a lower price than the desired sales price of the apparatus manufacturer. As a result of many information processing apparatus becoming popular among the users, the users use information contents provided by the information provider more frequently. As a result, it is expected that an increased amount of the charge is paid from the users to the information provider.

Therefore, an increased amount of the difference is returned from the information provider to the apparatus manufacturer. Thus, the sales and profits of each of the apparatus manufacturer and information provider can be increased. Moreover, there can be expanded a business scale of the entire information processing medium concerning the manufacturing technology field of information processing apparatus, technical field of providing the information used therefor, and the user using these information processing apparatus or information contents, which greatly contribute industrial development.

In the sales activity management apparatus according to the present invention, in the case of integrally managing business in which an apparatus manufacturer sells an information to a user, and an information provider sells available information contents at the information processing apparatus to the user, there is provided management control means, wherein an amount of money to be remitted to the apparatus manufacturer is set according to the sales information and use information on the information processing apparatus.

With this configuration, for example, automatic control can be performed such that an amount of money corresponding to the difference produced because the apparatus manufacturer has provided an information processing apparatus to the user at a low price is returned from the information provider to the apparatus manufacturer according to an amount of money for the charge collected from the user. Moreover, the sales of the information processing apparatus and information contents can be promoted.

In a sales activity management method according to the present invention, when an apparatus manufacturer sells an information processing apparatus to a user, and an information provider sells available information contents at the information processing apparatus to a user, a license agreement concerning sales of the information processing apparatus and information contents are made in advance between the apparatus manufacturer and the information provider. Then, the manufacture of the information processing apparatus is managed, and the information processing apparatus is forwarded to the user for sales at a sales price of the apparatus manufacturer. On the other hand, the available information contents at the information processing apparatus are provided to the user, and the charge is collected from the user. Thereafter, an amount of money to be remitted to the apparatus manufacturer is set according to an amount of money of the charge collected from the user.

With this configuration, for example, even in the case where the information processing apparatus is forwarded to the user for sales at a lower price than the desired sales price of the apparatus manufacturer, the apparatus manufacturer can obtain the charge produced under the license agreement made between the apparatus manufacturer and the information provider. Moreover, the sales of the information processing apparatus and information contents can be promoted.

The present invention is applied to business or the like of selling an information processing apparatus from an apparatus manufacturer to a user, and selling available information contents at the information processing apparatus from the information provider to the user, which is very preferable.

What is claimed is:

1. A sales activity management system for selling an information processing apparatus from an apparatus manufacturer to a user, and selling information contents available at the information processing apparatus from an information provider to the user, said activity management system comprising:
    a manufacture management terminal device for managing the manufacture of said information processing apparatus and the selling of said information processing apparatus to a user at a sales price less than a desired selling price of said apparatus manufacturer;
    an information management terminal device for providing said user with available information contents at said information processing apparatus and for collecting a charge based upon at least content sale information representing the sale of said information contents to said user available at said information processing apparatus; and
    a sales activity management apparatus for setting an amount of money to be remitted to said apparatus manufacturer based at least upon collections from said information management terminal device for the sale of said information contents to said user.

2. A sales activity management system as claimed in claim 1, wherein the sales price of said information processing apparatus is set according to an amount of money for the charge collected from said user.

3. A sales activity management system as claimed in claim 1, wherein a license agreement is made with respect to sales of an information processing apparatus and information contents between said apparatus manufacturer and said information provider.

4. A sales activity management system as claimed in claim 1, wherein said information provider is a broadcasting service provider for providing charged information contents to said user, and for collecting a reception charge from the user.

5. A sales activity management system as claimed in claim 1, wherein said information provider is a communication service provider that collects a base charge and an actual telephone call charge from the user.

6. A sales activity management system as claimed in claim 1, wherein said information provider is an information medium sales provider that, provides an information medium having information contents recorded therein to said user, and collects a payment of a product from the user.

7. A sales activity management system as claimed in claim 1, wherein essential parts of said information processing apparatus are manufactured, and wherein said manufacture management terminal device manages a sales price of a part manufacturer.

8. A sales activity management system as claimed in claim 7, wherein the sales price of said essential parts is set according to an amount of money for the charge collected from said user.

9. A sales activity management system as claimed in claim 7, wherein a license agreement is made with respect to sales of essential parts, information processing apparatus and information contents among said part manufacturer, apparatus manufacturer, and information provider.

10. A sales activity management system as claimed in claim 7, further comprising an accounting server system that integrally manages delivery information concerning number of deliveries for said essential parts, sales information concerning the sales quantity of said information processing apparatus and use information concerning a use quantity of said information contents.

* * * * *